(12) United States Patent
Ezawa et al.

(10) Patent No.: US 6,813,236 B2
(45) Date of Patent: Nov. 2, 2004

(54) MECHANISM FOR MOVING AN OPTICAL HEAD IN AN OPTICAL DISK APPARATUS

(75) Inventors: Kozo Ezawa, Hirakata (JP); Hironori Okazawa, Katano (JP); Kazuo Teramae, Hirakata (JP); Masanao Wakikawa, Sakai (JP); Terumi Tatsumi, Sendai (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 486 days.

(21) Appl. No.: 09/951,564

(22) Filed: Sep. 11, 2001

(65) Prior Publication Data

US 2002/0034139 A1 Mar. 21, 2002

(30) Foreign Application Priority Data

Sep. 21, 2000 (JP) .................................... 2000-286709
Mar. 12, 2001 (JP) .................................... 2001-068926

(51) Int. Cl.[7] ............................................. G11B 17/00
(52) U.S. Cl. ....................................... 369/249; 369/253
(58) Field of Search ........................... 369/44.14, 44.15, 369/44.21, 53.18, 44.17, 44.22, 244, 249, 253

(56) References Cited

FOREIGN PATENT DOCUMENTS

| JP | 06-124551 | 6/1994 |
|----|-----------|--------|
| JP | 2902876   | 3/1999 |

*Primary Examiner*—Paul W. Huber
(74) *Attorney, Agent, or Firm*—Renner, Otto, Boisselle & Sklar, LLP

(57) ABSTRACT

An optical disk apparatus capable of stably moving an optical head is provided. The apparatus includes an optical head for recording data to or reproducing data from a disk, a first guide member having an axis substantially parallel to the disk for supporting the optical head in such a manner that the optical head is moved along the axis, a second guide member for limiting rotation of the optical head about the axis, a rack mounted on the optical head and having a reference pitch line substantially parallel to the axis, a pinion for moving the optical head by the pinion being engaged with the rack and being rotated, and a pressing member for pressing the rack toward tie pinion. The vector of a force exerted by the pinion on the rack in response to the pressing member pressing the rack toward the pinion substantially intersects the axis.

14 Claims, 18 Drawing Sheets

MECHANISM FOR MOVING AN OPTICAL HEAD IN AN OPTICAL DISK APPARATUS

BACKGROUND OF THE INVENTION

1. Field of the Invention

The present invention relates to an optical disk apparatus. More specifically, the present invention relates to an optical disk apparatus including a mechanism for moving an optical head.

2. Description of the Related Art

A recording and reproduction apparatus (optical disk apparatus) for recording data to and reproducing data from a disk (recording medium) using an optical head requires a mechanism for moving an optical head from an inner circumference to an outer circumference of a recording region of the disk. A mechanism in which an optical head is moved along a pair of parallel guide members is widely used.

Japanese Patent No. 2902876 discloses a conventional technique adopting such a mechanism in the technique disclosed in Japanese Patent No. 2902876, a driving force for moving an optical head is transferred from a pinion to a rack which are mounted on the optical head. The optical head is slid along a column-shaped guide shaft (guide member). The rack is provided in the optical head in such a manner as to be rotated about the guide shaft.

FIG. 15A is a side view showing a moving mechanism of an optical head described in Japanese Patent No. 2902876.

FIG. 15B is a plan view of the moving mechanism of the optical head of FIG. 15A, viewed in a direction indicated by an arrow B.

The moving mechanism of the optical head described in Japanese Patent No. 2902876 will be described below with reference to FIG. 15A. An optical head 102 is moved along guide shafts 101R and 101L in and out with respect to the plane of the figure.

A rack 103 is pressed by a pressing spring 106 in a direction from the optical head 102 to a small gear 105S. The rack 103 is supported by the guide shaft 101R as a supporting shaft in such a manner as to be freely rotated in a direction indicated by an arrow 201.

Referring to FIGS. 15A and 15B, the optical head 102 is guided by the guide shafts 101R and 101L which are arranged in parallel. The optical head 102 is configured to be moved in a direction indicated by an arrow 202. The rack 103 seizes a shaft bearing 1001 of the guide shaft 101R of the optical head 102 by holding the opposite ends of the shaft bearing 1001, and is supported by the guide shaft 101R in such a manner as to be freely rotated.

A driving force for the optical head 102 is transferred from a driving gear 104 driven by a motor to a large gear 105L. The large gear 105L and the small gear 105S (pinion) are integrated to constitute a stepped gear 105 so that the driving force is decelerated and transferred from the small gear 105S to the rack 103.

As the driving force of the motor causes the rack 103 to be moved in the direction indicated by the arrow 202 (FIG. 15B), the optical head 102 whose shaft bearing 1001 is seized by the rack 103 is moved.

FIG. 16 shows states of the rack 103 and the small gear 105S which are engaged with each other. When the rack 103 and the small gear 105S are too close to each other, the gear teeth of the rack 103 and the small gear 105S interfere with each other, obstructing the transference of a driving force. To avoid such an adverse situation, a certain amount of backlash is provided between the gear teeth of the rack 103 and the small gear 105S, which is a known technique. FIG. 16 shows, by reference numeral 103A, the positions of gear teeth of the rack 103 when backlash is provided. Backlash is also inevitably present due to pitch error in the engagement of gears.

In optical disk apparatuses. the provision of such backlash is responsible for a large level of lag in a direction of the movement of the optical head 102. This lag may be several tens to several hundreds times as large as the pitch of data tracks on the optical disk. Since optical disk apparatuses need to move an optical head with considerably high precision, the removal of such backlash is required.

In the conventional technique disclosed in Japanese Patent No. 2902876, the rack 103 is pressed by the pressing spring 106 (FIG. 15A) in a direction indicated by an arrow 203 (FIG. 16) so as to remove backlash. Reference numeral 103B indicates the position of the gear teeth of the rack 103 pressed by the pressing spring 106. In this case, the gear teeth of the small gear 105S are pressed by the gear teeth of the rack 103.

Optical disk apparatuses require very highly-precise and high-speed movement of an optical head. Thus, the stability is required for the movement of an optical head. To this end, it is important to reduce a load on the movement of the optical head 102 generated between the pair of parallel guide shafts 101R and 101L and the optical head 102 as much as possible. Therefore, friction between the pair of parallel guide shafts 101R and 101L and the sliding optical head 102 needs to be reduced as much as possible.

In the above-described conventional technique, as shown in FIG. 15A, the pressing spring 106 is attached to a point 102A of the optical head 102. The pressing spring 106 is compressed so as to press the rack 103 against the small gear 105S. Therefore, a moment 204 around the guide shaft 101R is exerted on the optical head 102 by the pressing spring 106. A reaction 1901 canceling the moment 204 is generated at the guide shaft 101L, and exerted on the optical head 102. The greater the reaction 1901, the greater the friction between the guide shaft 101L and a sliding portion of the optical head 102. The large friction significantly reduces the movement stability of the optical head 102.

The number of movements of the optical head 102 may reach several millions or more before the life of the optical disk apparatuses is expired. A large number of movements of the optical head 102 lead to much abrasion of the gear teeth of the rack 103, such that the optical head 102 may be eventually brought to a state where it cannot be moved. In such a case, the rack 103 needs to be replaced. Also in the production process of optical disk apparatuses, a defective rack 103 may be found after it is already integrated into the body and therefore needs to be replaced. Therefore, it is desirable to easily replace the rack 103.

In the conventional optical disk apparatus of FIG. 15B. when the rack 103 needs to be replaced, the guide shaft 101R needs to be temporarily removed since the guide shaft 101R goes through the rack 103. When the guide shaft 101R is reattached, the tilt of the guide shaft 101R needs to be adjusted to set the tilt of the optical head 102. This adjustment typically requires considerable time and effort. As such, in the conventional technique, the rack 103 cannot be easily attached to and detached from the optical head 102.

SUMMARY OF THE INVENTION

According to one aspect of the present invention, an optical disk apparatus includes an optical head for recording data to or reproducing data from a disk having a recording region ranging from an outer circumference portion to an inner circumference portion, a first guide member having a first axis substantially parallel to the disk, for supporting the optical head in such a manner that the optical head can be moved along the first axis from an end of the outer circumference portion to an end of the inner circumference portion, a second guide member for limiting rotation of the optical head about the first axis, a rack provided on the optical head, having a reference pitch line substantially parallel to the first axis, a pinion for moving the optical head by the pinion being engaged with the rack and being rotated, and a pressing member for pressing the rack toward the pinion. The vector of a force exerted by the pinion on the rack in response to the pressing member pressing the rack toward the pinion substantially intersects the first axis.

In one embodiment of this invention, the rack is mounted on the head in such a manner that the rack can be rotated about a second axis substantially parallel to the reference pitch line.

In one embodiment of this invention, the rack is mounted on the optical head in such a manner that the rack can be attached to and detached from the optical head.

In one embodiment of this invention, a protruding portion is provided on one of the rack and the optical head, a pit portion is provided on the other of the rack and the optical head, and the rack is mounted by the optical head by engagement of the protruding portion with the pit portion.

In one embodiment of this invention, the protruding portion has a shape obtained by cutting a portion of a cylinder along a plane parallel to an axis of the cylinder, the pit portion is provided with a groove having a width smaller than a diameter of the cylinder, and the protruding portion is passed through the groove when the rack is attached to and detached from the optical head.

In one embodiment of this invention, the optical disk apparatus further includes an elastic member for pressing the rack in a direction along the second axis so as to substantially remove a gap between the rack and the optical head along the second axis.

In one embodiment of this invention, the pressing member and the elastic member are integrated together.

In one embodiment of this invention, the rack is mounted on the optical head in such a manner that a portion of the rack engaged with the pinion can be rotated about a second axis substantially parallel to the reference pitch line. The rack is made of flexible material and a portion of the rack along the second axis has a shape so that the rack can be bent about the second axis.

In one embodiment of this invention, displacement of the rack is limited to such an extent that engagement of the rack with the pinion is released when the optical head is located at a first position which is at one of the end of the inner circumference portion and the end of the outer circumference portion, and the displacement of the rack is allowed to such an extent that the engagement of the rack with the pinion is released when the optical head is located at a second position which is at the other of the end of the inner circumference portion and the end of the outer circumference portion and when a turning force greater than or equal to a predetermined value is exerted on the pinion.

In one embodiment of this invention, a first portion of the rack is engaged with the pinion when the optical head is located at the first position, and a second portion of the rack is engaged with the pinion when the optical head is located at the second position. The optical head includes a first contacting member for limiting a first contact point of the rack from being displaced away from the pinion, and a second contacting member for limiting a second contact point of the rack from being displaced away from the pinion. The first portion is located in a range between the first and second contact points of the rack. The second portion is located outside the range between the first and second contact points of the rack.

In one embodiment of this invention, the rack is mounted on the optical head in such a manner that the rack can be rotated about a second axis parallel to the reference pitch line, and the rack is deformed in such a manner that the reference pitch line and the second axis have a skewed relationship without intersection when the optical head is located at the second position and when a turning force greater than or equal to a predetermined value is exerted on the pinion.

In one embodiment of this invention, the optical disk apparatus further includes a driving section for rotating the pinion in the presence of applied driving current. The predetermined value is set so that a magnitude of the driving currents required to drive the pinion to obtain a turning force having the predetermined value, is less than or equal to a tolerable value above which a thermal influence interferes with the optical disk apparatus.

According to another aspect of the present invention, an optical disk apparatus includes an optical head for recording data to or reproducing data from a disk having a recording region ranging from an outer circumference portion to an inner circumference portion, a first guide member having a first axis substantially parallel to the disk, for supporting the optical head in such a manner that the optical head can be moved along the first axis from an end of the outer circumference portion to an end of the inner circumference portion, a second guide member for limiting rotation of the optical head about the first axis, a rack provided on the optical head, having a reference pitch line substantially parallel to the first axis, a pinion for moving the optical head by the pinion being engaged with the rack and being rotated about a third axis substantially perpendicular to the reference pitch line, and a pressing member for pressing the rack toward the pinion. A line perpendicular to both the third axis and the reference pitch line substantially intersects the first axis.

According to another aspect of the present invention, an optical disk apparatus includes an optical head for recording data to or reproducing data from a disk having a recording region ranging from an outer circumference portion to an inner circumference portion, a first guide member having a first axis substantially parallel to the disk, for supporting the optical head in such a manner that the optical head can be moved along the first axis from an end of the outer circumference portion to an end of the inner circumference portions a second guide member for limiting rotation of the optical head about the first axis, a rack provided on the optical head, having a reference pitch line substantially parallel to the first axis, a pinion for moving the optical head by the pinion being engaged with the rack and being rotated, and a pressing member for pressing the rack toward the pinion. The vector of a force exerted by the pinion on the rack in response to the pressing member pressing the rack toward the pinion substantially intersects the first axis. Displacement of the rack is limited to such an extent that engagement of the rack with the pinion is released when the optical head is located at a first position which is at one of the end of the inner circumference portion and the end of the outer circumference portion, and the displacement of the rack is allowed to such an extent that the engagement of the rack with the pinion is released when the optical head is located at a second position which is at the other of the end of the inner circumference portion and the end of the outer circumference portion and when a turning force greater than or equal to a predetermined value is exerted on the pinion.

Thus, the invention described herein makes possible the advantages of providing: (1) an optical disk apparatus capable of moving an optical head in a stable manner; and (2) an optical disk apparatus in which a rack can be easily attached to and detached from an optical head.

These and other advantages of the present invention will become apparent to those skilled in the art upon reading and understanding the following detailed description with reference to the accompanying figures.

DESCRIPTION OF THE PREFERRED EMBODIMENTS

Figure 1A:
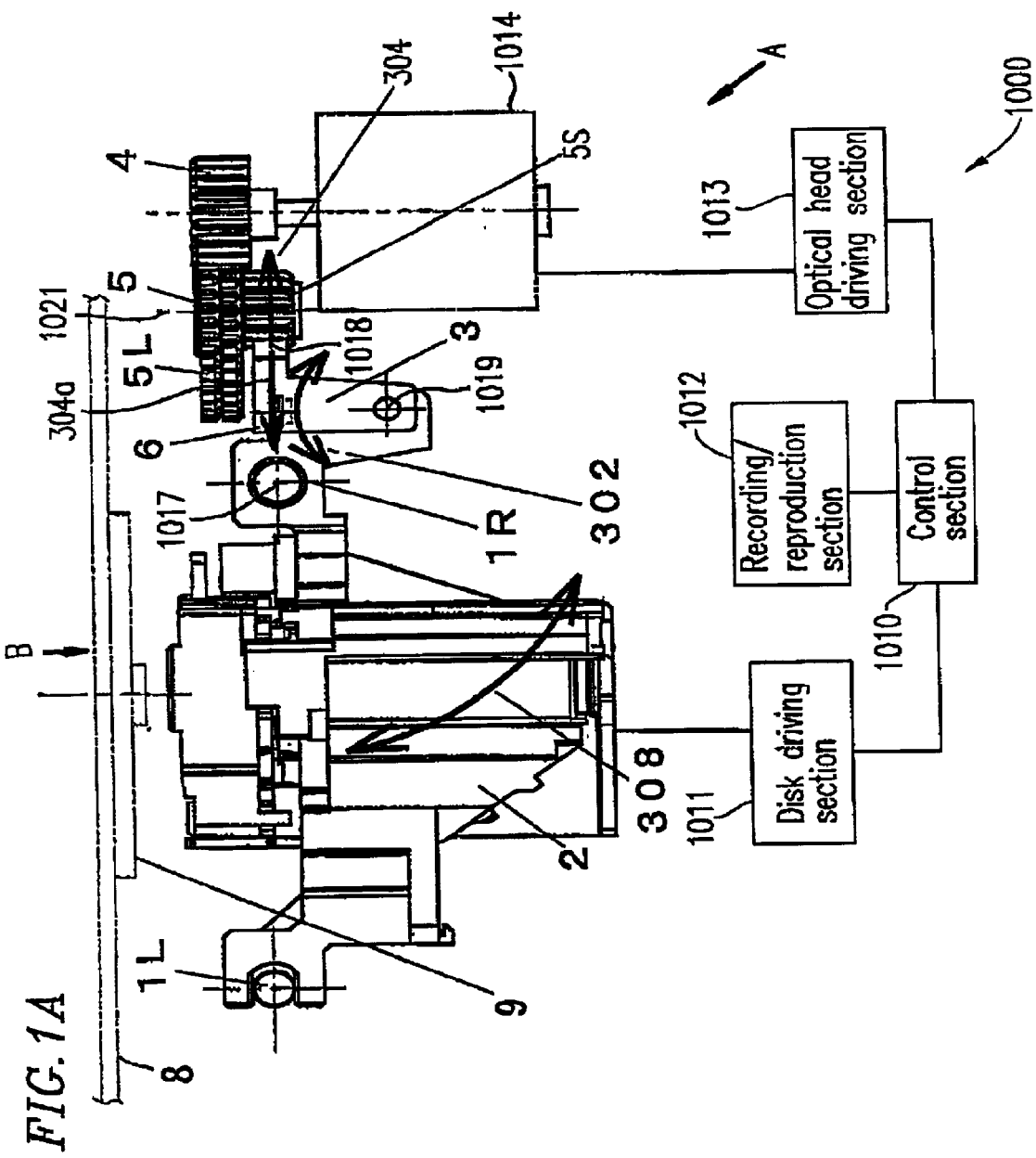
FIG. 1A is a diagram showing a configuration of an optical disk apparatus 1000 according to the present invention.

Hereinafter, the present invention will be described by way of illustrative examples with reference to the accompanying drawings. Like reference characters refer to like parts throughout, and description is not duplicated.

FIG. 1A shows a configuration of an optical disk apparatus 1000 according to the present invention. The optical disk apparatus 1000 comprises an optical head 2, a disk driving section 1011, a recording/reproduction section 101, an optical head driving section 1013, a control section 1010, and a motor 1014.

In FIG. 1A, the disk driving section 1011, the recording/reproduction section. 1012, the optical head driving section 1013, and the control section 1010 may have a known structure and are therefore indicated by functional blocks.

The disk driving section 1011 drives a motor (not shown) for rotating a turntable 9 on which a disk 8 (recording medium) is placed. The disk 8 may be any optical disk, such as a DVD, a CD, a CD-R, a CD-ROM and the like.

An optical head 2 is used to record data onto the disk 8 and/or reproduce data stored in the disk 8. The recording/reproduction section 1012 processes data reproduced from the disk 8. The recording/reproduction section 1012 also generates data to be recorded onto the disk 8, and outputs such data to the optical head 2.

The disk 8 has a recording region ranging from an outer circumference portion to an inner circumference portion. The optical head 2 is moved between the outer circumference portion and the inner circumference portion so as to record data to and/or reproduce data from a desired portion of the recording region. The optical head 2 is moved in and out in FIG. 1A with respect to the plane of the figure.

The optical head driving section 1013 drives the motor 1014 by applying a driving current thereto so as to move the optical head 2.

The control section 1010 controls the disk driving section 1011, the recording/reproduction section 1012, and the optical head driving section 1013.

Figure 1B:
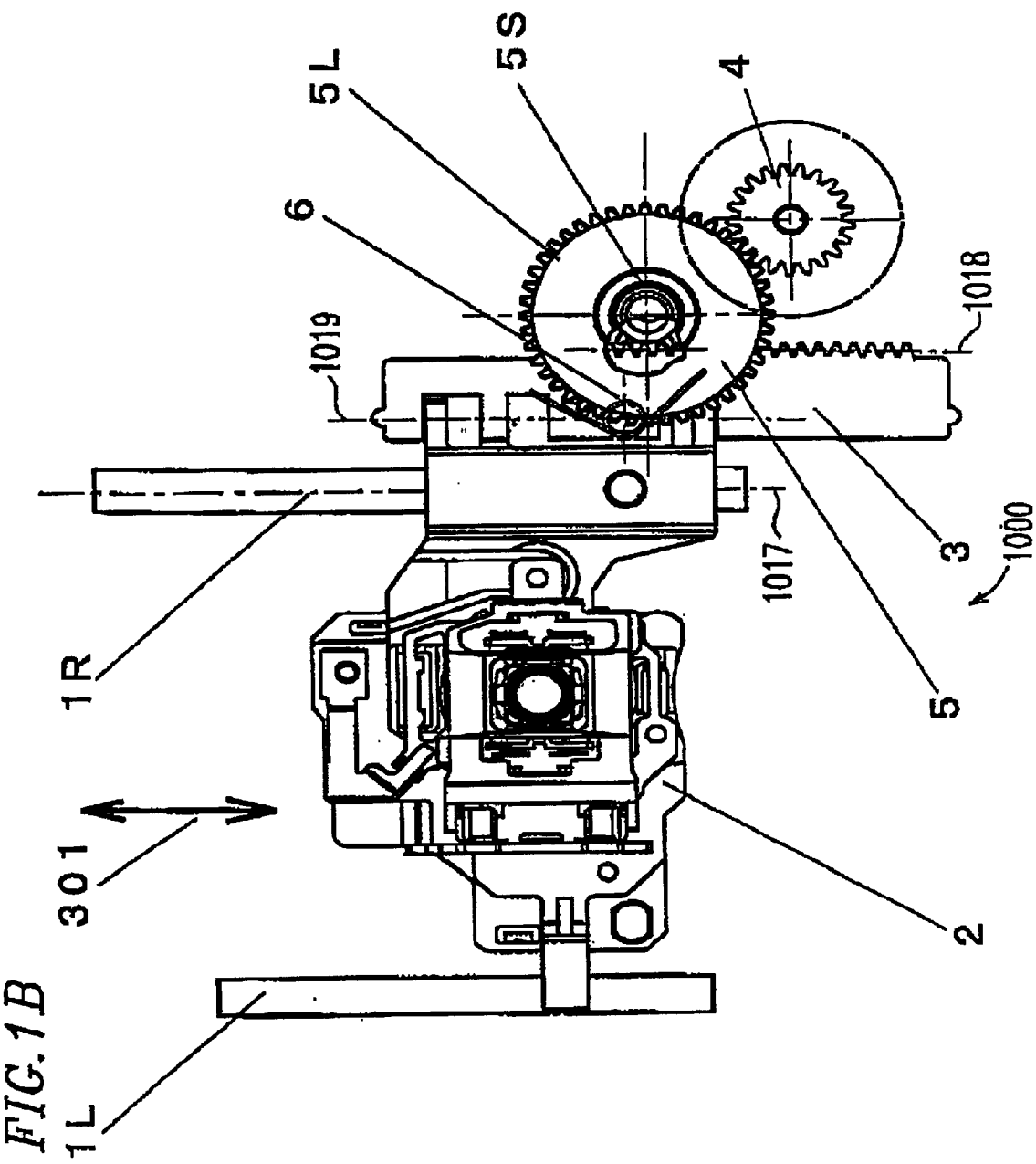
FIG. 1B is a plan view of the optical disk apparatus 1000 of FIG. 1A of the present invention viewed in a direction indicated by an arrow B.

FIG. 1B is a plan view of the optical disk apparatus 1000 of FIG. 1A of the present invention, viewed in a direction indicated by an arrow B. It should be noted that in FIG. 1B, the control section 1010, the disk driving section 1011, the recording/reproduction section 1012, the optical head driving section 1013, and the disk 8 are not shown for reasons of clarity. An arrow 301 indicates a direction of movement of the optical head 2.

Referring to FIG. 1A again, the moving mechanism of the optical head 2 used in the optical disk apparatus 1000 of the present invention will be described below.

The optical disk apparatus 1000 comprises a guide shaft 1R (first guide member), a guide shaft 1L (second guide member), a rack 3 mounted on the optical head 2, a stepped gear 5, and a pressing spring 6 (pressing means), those of which constitute the moving mechanism of the optical head 2.

A driving gear 4 is attached to a shaft of the motor 1014. The stepped gear 5 comprises a small gear 5S (pinion) which engages with the rack 3 and a large gear 5L engaged with the driving gear 4, which are integrated with each other.

A driving current is applied to the motor 1014 which is in turn rotated. The driving gear 4 is rotated in association with the rotation of the motor 1014. The turning force of the driving gear 4 is transferred to the large gear 5L of the stepped gear 5 which is in turn rotated. Finally, the small gear 5S engaged with the rack 3 is rotated. In this manner, as a whole, the motor 1014, the driving gear 4, and the large gear 5L function as a driving section for rotating the small gear 5S in the presence of an applied driving current.

The small gear 5S is engaged with the rack 3 and is rotated about a rotation axis 1021 so as to move the optical head 2. The rotation axis 1021 is substantially perpendicular to the reference pitch line 1018 of the rack 3.

The guide shaft 1R has a central axis 1017 (first axis) which is substantially parallel to the disk B. The guide shaft 1R supports the optical head 2 in such a manner that the optical head 2 can be moved along the central axis 1017 from an end of the outer circumference portion to an end of the inner circumference portion of the disk 8. As used herein, "substantially parallel" and "substantially perpendicular" refers to being parallel and perpendicular, respectively, within a typical design error.

The guide shaft 1L limits (or constrains) the rotation of the optical head 2 around the central axis 1017.

The rack 3 is mounted on the optical head 2 while the pressing spring 6 is integrated with the rack 3. The rack 3 can be rotated about an axis 1019 (second axis) in a direction indicated by an arrow 302.

Figure 2:
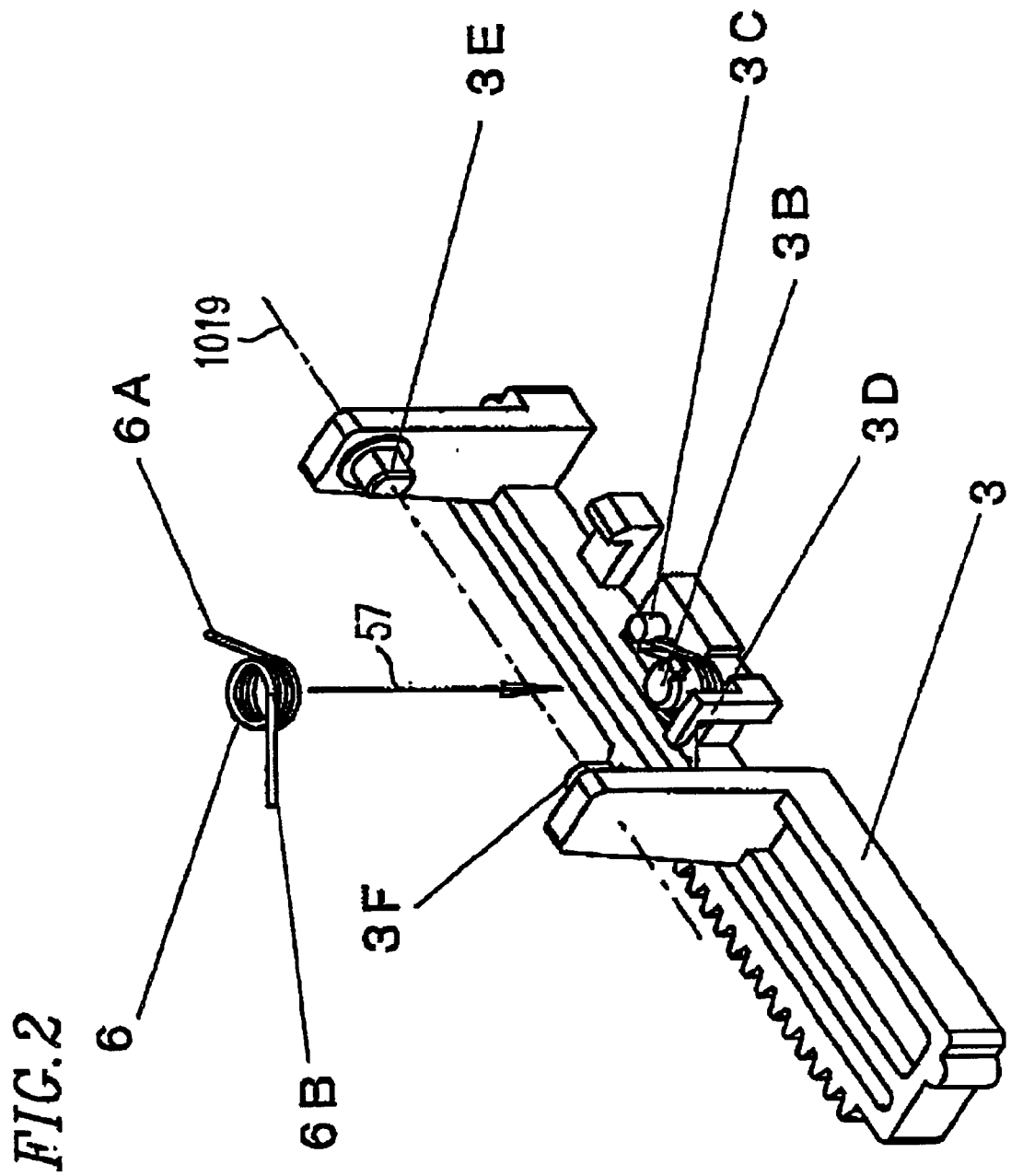
FIG. 2 is a diagram showing how a pressing spring 6 is integrated into a rack 3 which is detached from an optical head 2 of FIG. 1A.

FIG. 2 shows how the pressing spring 6 is integrated into the rack 3, which is detached from the optical head 2 in FIG. 1A. In the example shown in FIG. 2, the pressing spring 6 is a torsion coil spring.

The coil center of the pressing spring 6 is slid onto a supporting boss 33 provided on the rack 3 (arrow 57). A spring end 6A of the pressing spring 6 is hooked with a stop boss 3C, while another spring end 6B of the pressing spring 6 is hooked with a hook 3D. The hook 3D is provided in order to hold the spring end 6B temporarily when the rack 3 is detached from the optical head 2.

The rack 3 having the thus-integrated pressing spring 6 is mounted on the optical head 2 in such a manner that the rack 3 can be rotated about an axis 1019 (second axis) passing through both centers of rotational supporting shafts 3E and 3F.

Figure 3:
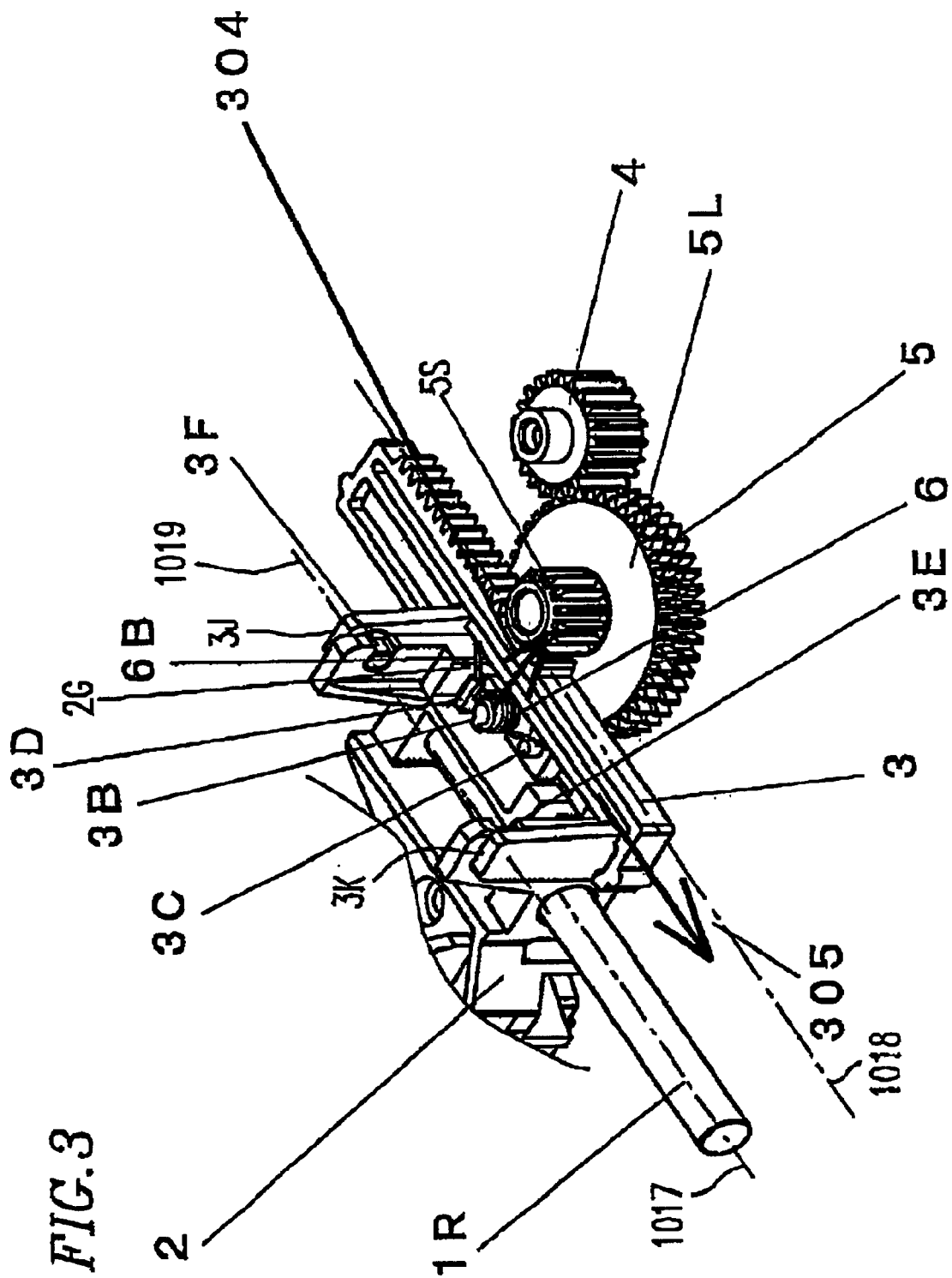
FIG. 3 is a diagram showing the rack 3 being mounted on the optical head 2 of FIG. 1A.

FIG. 3 shows the rack 3 mounted on the optical head 2, viewed in the direction indicated by the arrow A of FIG. 1A. When the rack 3 is mounted on the optical head 2, the central axis 1017 of the guide shaft 1R is substantially parallel to a reference pitch line 1018 of the rack 3. As shown in FIG. 3, the rack 3 seizes the optical head 2 with arms 3J and 3K. Therefore, as the rack 3 is moved by the rotating small gear 5S. the optical head 2 is moved.

In FIG. 3, the spring end 6B contacts and presses a corner 2G of the optical head 2 and is released from the hook 3D. Therefore, by pressing the corner 2G of the optical head 2, the pressing spring 6 presses the supporting boss 3B in a direction indicated by an arrow 304.

As described above, with this simple configuration, the rack 3 is reliably and smoothly pressed toward the small gear 5S.

Since the rack 3 is pressed toward the small gear 5S, backlash between the gear teeth of the rack 3 and the small gear 5S can be substantially removed.

Figure 4:
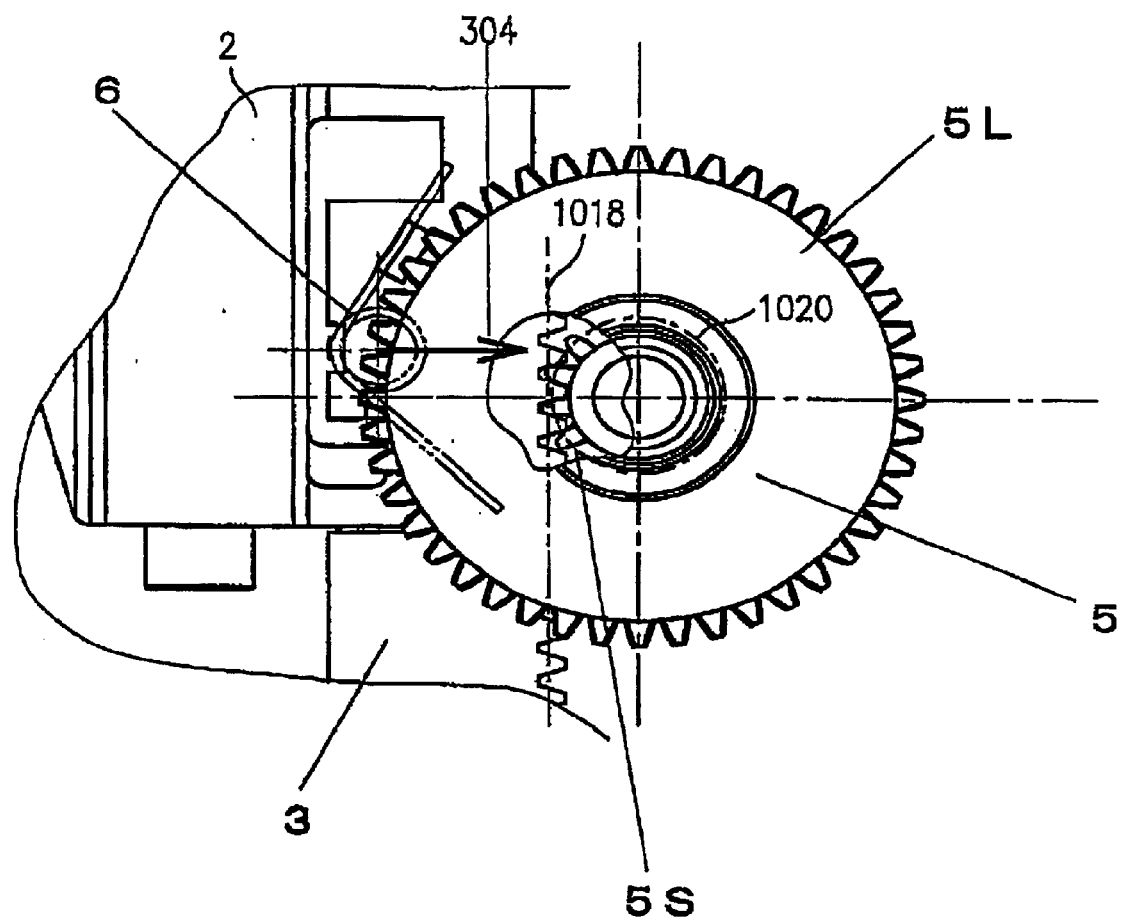
FIG. 4 is a diagram showing the rack 3 being pressed toward a small gear 5S of FIG. 1A.

FIG. 4 shows the rack 3 being pressed toward the small gear 5S.

The shapes of the rack 3 and the small gear 5S are designed in such a manner that the rack 3 is moved at a constant linear velocity when the small gear 5S is rotated at a constant angular velocity. To this end, for example, the gear tooth of the rack 3 may be in the shape of a trapezoid while the small gear 5S may have involute teeth. When the rack 3 and the small gear 5S are designed in this manner, the engagement between the rack 3 and the small gear 5S is represented by a contact between the reference pitch line 1018 of the rack 3 and a reference pitch circle 1020 of the small gear 5S.

The reference pitch line 1018 of the rack 3 passes through the center of an engaging width between the rack 3 and the small gear 5S.

Referring to FIG. 1A again, a description will be given of a principle of the optical head 2 which can be stably moved in the optical disk apparatus 1.

As described above, the pressing spring 6 presses the rack 3 toward the small gear 5S (arrow 304: this pressing force is referred to as pressing force 304). In response to this pressing, the small gear 5S exerts a reaction 304a on the rack 3. The optical disk apparatus 1 is designed so that the vector of the reaction 304a substantially intersects the central axis 1017.

When the vector of the reaction 304a intersects the central axis 1017, the moment of the rack 3 around the central axis 1017 due to the reaction 304a is zero. Therefore., the optical head 2 carrying the rack 3 does not have a moment around the central axis 1017. As a result, a reaction canceling (or opposing) a moment around the central axis 1017 exerted on the optical head 2 is not generated at the guide shaft 1L. Therefore, an increase in the friction between the guide shaft 1L and a sliding portion of the optical head 2 due to such a reaction does not occur, so that the optical head 2 can be moved in a stable manner.

It should be noted that "the vector of the reaction 304a substantially intersects the central axis 1017" includes a meaning that even if the vector of the reaction 304a does not accurately intersect the central axis 1017, the resultant reaction (opposing the moment) occurring at the guide shaft 1L is smaller than a load normally exerted on the guide shaft 1L caused by the weight of the optical head 2.

As is seen from FIGS. 1A and 3, the pressing force 304 pressing the rack 3 against the small gear 5S is perpendicular to the reference pitch line 1018 of the rack 3 and the rotation axis 1021 of the small gear SS. Since the reaction 304a (FIG. 1A) is equal and opposite to the force which presses the rack 3 against the small gear 5S, the vector of the reaction 304a is in a line perpendicular to both the reference pitch line 1018 of the rack 3 and the rotation axis 1021 of the small gear 5S. Therefore, "the vector of the reaction 304a which substantially intersects the central axis 1017" is equivalent to "a line perpendicular to both the reference pitch line 1018 of the rack 3 and the rotation axis 1021 of the small gear 5S which substantially intersects the central axis 1017". Such a perpendicular line should be interpreted as a line including a line segment between the reference pitch line 1018 and the rotation axis 1021, but not the line segment itself.

The optical disk apparatus 1000 of the present invention has various advantages other than the above-described advantage that the optical head 2 can be stably moved. Hereinafter, advantages of the optical disk apparatus 1000 of the present invention will be described.

1. Attachment and Detachment of An Optical Head to or from a Rack

Figure 5:
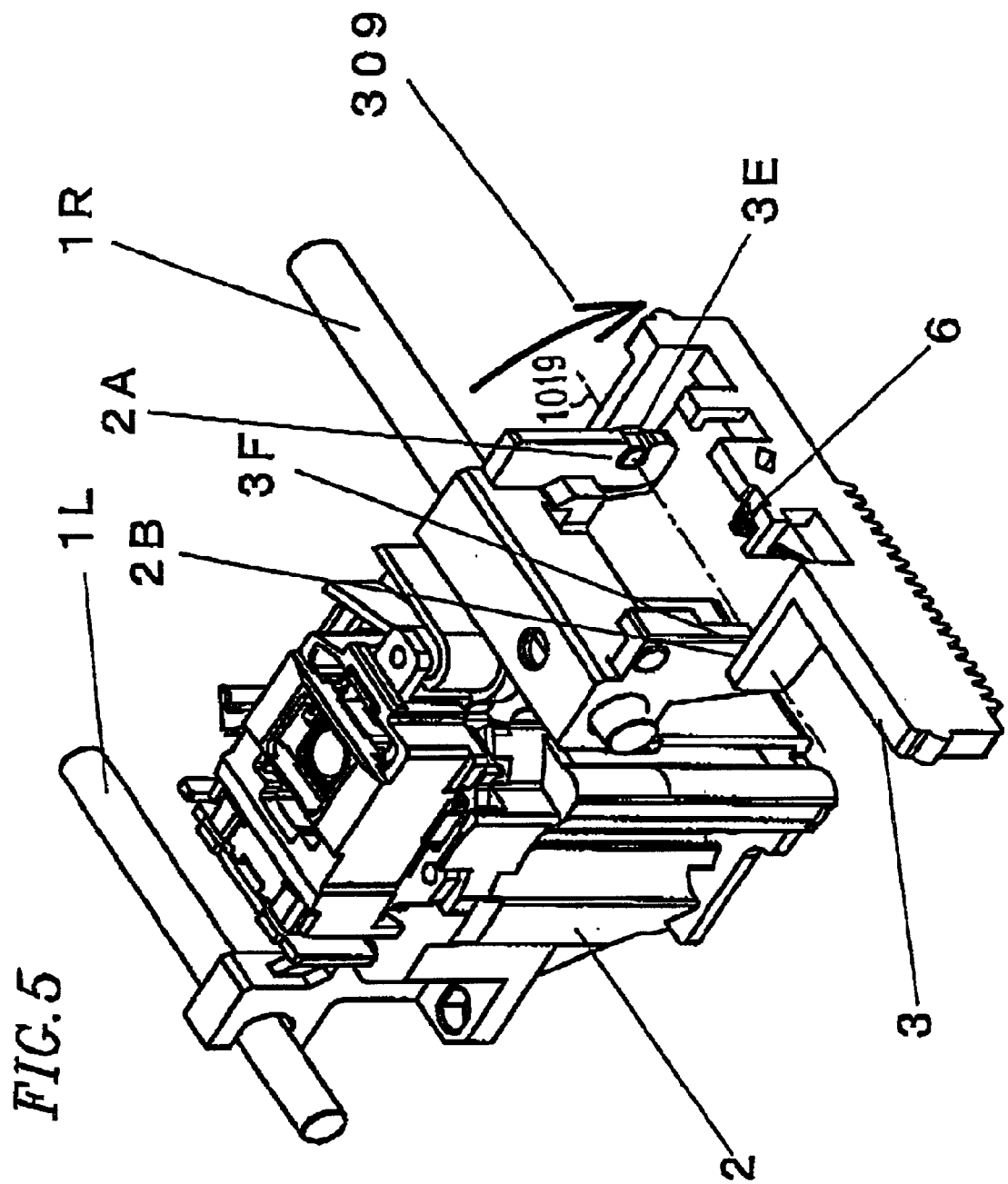
FIG. 5 is a diagram showing how the rack 3 is detached from the optical head 2 of FIG. 1A.

FIG. 5 shows a manner in which the rack 3 is detached from the optical head 2. The rack 3 is detached after the stepped gear 5 and the motor 1014 are detached from the optical disk apparatus 1000. In this situation, the rack 3 can be rotated by 90° about the axis 1019 in a direction indicated by an arrow 309.

The rack 3 is mounted on the optical head 2 by rotational supporting shafts 3E and 3F (protruding portions) being engaged with respective rotation holes 2A and 2B (pit portion).

Figure 6A:
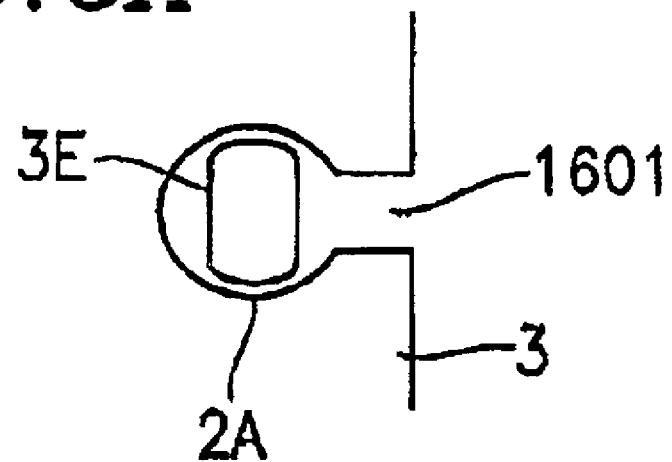
FIG. 6A is a diagram showing a relationship between a rotational supporting shaft 3E and a rotation hole 2A of FIG. 2 where the rack 3 is mounted on the optical head 2 of FIG. 1A.

FIG. 6A shows a relationship between the rotational supporting shaft 3E and the rotation hole 2A where the rack 3 is mounted on the optical head 2. The rotational supporting shaft 3B (protruding portion) has a shape obtained by cutting a portion of a cylinder along a plane parallel to an axis of the cylinder. In the example of FIG. 6A, the rotational supporting shaft 3E has a shape obtained by cutting a portion of a cylinder along two parallel planes at an equal distance from an axis of the cylinder. Further, the rotation hole 2A (pit portion) has a groove 1601, through which the rotational supporting shaft 3E is passed when the rack 3 is attached to or detached from the optical head 2. The groove 1601 has a width smaller than the diameter of the cylinder.

The width of the groove 1601 is smaller than the diameter of the rotational supporting shaft 3E. Therefore, when the rotational supporting shaft 3E is in the position shown in FIG. 6A, the center of the rotational supporting shaft 3E is identical to the center of the rotation hole 2A, and the rotational supporting shaft 3E cannot be detached from the rotation hole 2A.

Figure 6B:
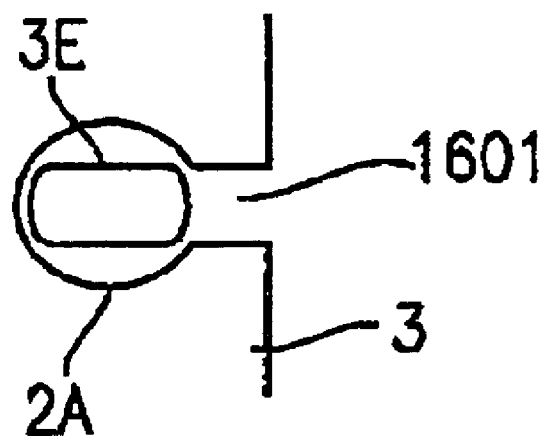
FIG. 6B is a diagram showing a relationship between the rotational supporting shaft 3E and the rotation hole 2A of FIG. 2 when the rack 3 is turned by 90° in the direction indicated by an arrow 309 of FIG. 5.

FIG. 6B shows a relationship between the rotational supporting shaft 3E and the rotation hole 2A when the rack 3 is turned by 90° in the direction indicated by the arrow 309 (FIG. 5). In the case of FIG. 6B, the rotational supporting shaft 3E can be passed through the groove 1601.

A relationship between a rotational supporting shaft 3F and the rotation hole 2B is similar to the above-described relationship between the rotational supporting shaft 3E and the rotation hole 2A as shown in FIGS. 6A and 6B.

Figure 7:
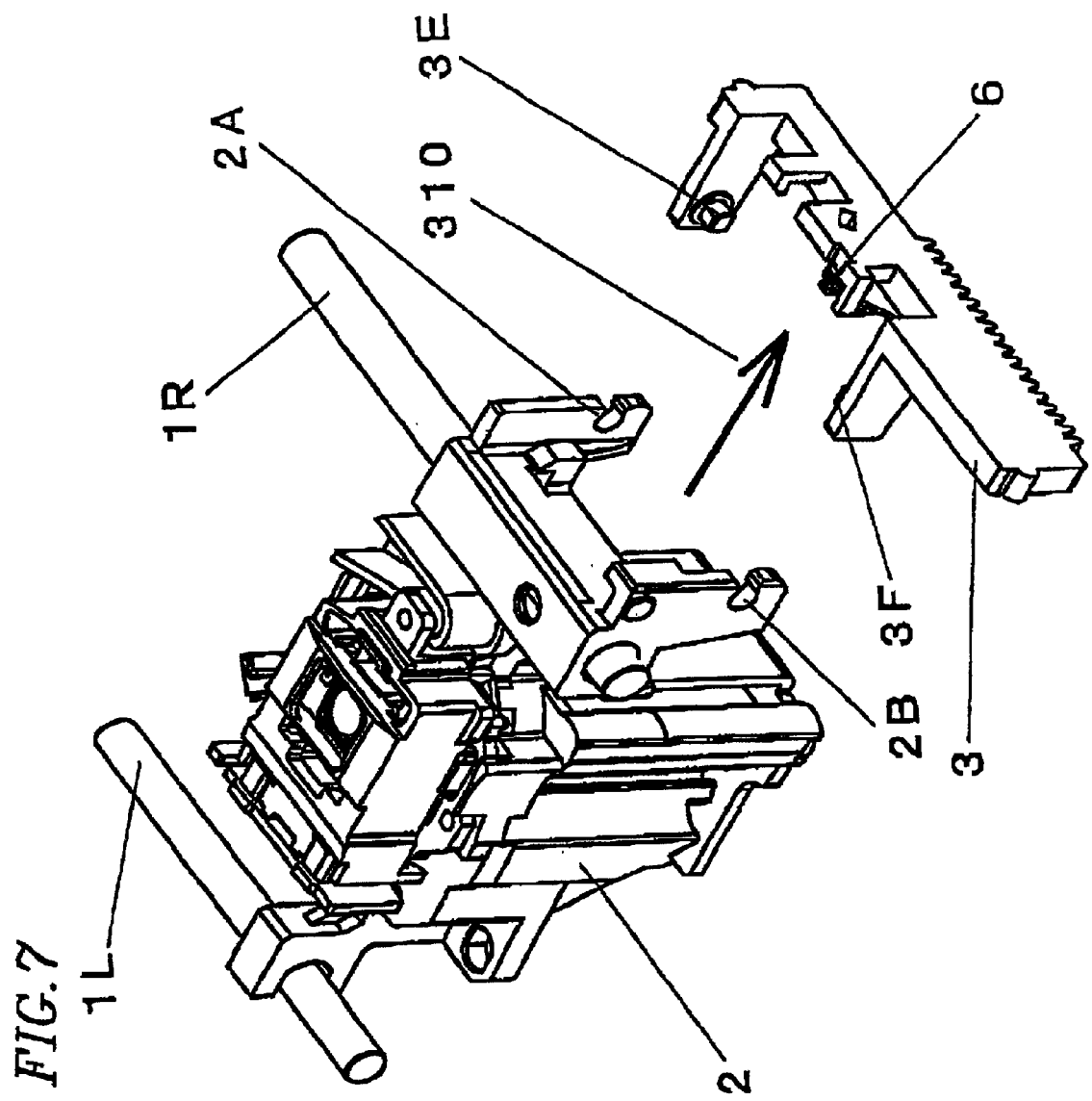
FIG. 7 is a diagram showing how the rack 3 is detached from the optical head 2 of FIG. 1A.

FIG. 7 shows a manner in which the rack 3 is detached from the optical head 2. As shown in FIG. 7, the rack 3 turned by 90° in the direction indicated by the arrow 309 (FIG. 5) is drawn toward a direction indicated by an arrow 310, so that the rack 3 is easily detached from the optical head 2.

The rack 3 can be easily attached to the optical head 2 in accordance with the above-described detachment procedure in reverse order. Since the guide shaft 1R does not need to be detached from the optical head 2 when the rack 3 is attached to and detached from the optical head 2, the rack 3 can be easily attached to and detached from the optical head 2.

In the optical disk apparatus 1000, the rack 3 and the optical head 2 are provided with a rotational supporting shaft (protruding portion) and a rotation hole (pit portion). respectively, which are engaged with each other so that the rack 3 is mounted on the optical head 2. Thus, the number of parts is not increased in order to mount the rack 3 on the optical head 2.

In the above-described example, the rack 3 is provided with the rotational supporting shafts 3E and 3F (protruding portions), while the optical head 2 is provided with the rotation holes 2A and 2B (pit portions). Conversely, the rack 3 may be provided with a pit portion, while the optical head 2 is provided with a protruding portion which is engaged with the pit portion.

In the above-described example, the rack 3 is turned by 90° in order to be detached from the optical head 2. Such a turning angle is not limited to 90°. The rack 3 and the optical head 2 may be designed so that the rack 3 may be detached from the optical head 2 at any position other than a normal position.

2. Pressing of the Rack along the Second Axis

As described with reference to FIG. 3, the rack 3 seizes the optical head 2 by the arms 3J and 3K. In order to enable the rack 3 to be rotated about the axis 1019 (second axis), a distance between the arms 3J and 3K is set so that a predetermined amount of clearance (gap) between the arms 3J and 3K and the optical head 2 is created. Such clearance between the rack 3 and the optical head 2 in the direction of the axis 1019 is disadvantageous in terms of the following of the rack 3 by the optical head 2.

In the optical disk apparatus 1000 of the present invention, when the optical head 2 is normally moved, the rack 3 is pressed along the axis 1019 in such a manner as to remove such clearance. The pressing of the rack 3 is achieved by the pressing spring 6 pressing the corner 2G of the optical head 2 as shown in FIG. 3. Specifically, as a result of the pressing spring 6 pressing the corner 2G of the optical head 2, the pressing force 304 pressing the rack 3 toward the small gear 5S and a pressing force 305 pressing the rack 3 along the axis 1019 are generated concurrently.

As described above, the pressing spring 6 functions as a pressing means for pressing the rack 3 toward the small gear 5S as well as an elastic means for pressing the rack 3 along the axis 1019. That is, in this example, both the pressing means and the elastic means are integrated together. Therefore, the number of parts is small, leading to advantages in terms of apparatus cost and assembly cost. Alternatively, the pressing means and the elastic means may be separated.

In the normal movement of the optical head 2, the clearance in the direction of the reference pitch line 1018 is thus removed. However, when a great force is exerted on the rack 3, a required amount of clearance can be secured by the pressing spring 6 being bent.

3. Safety Mechanism

Figure 8:
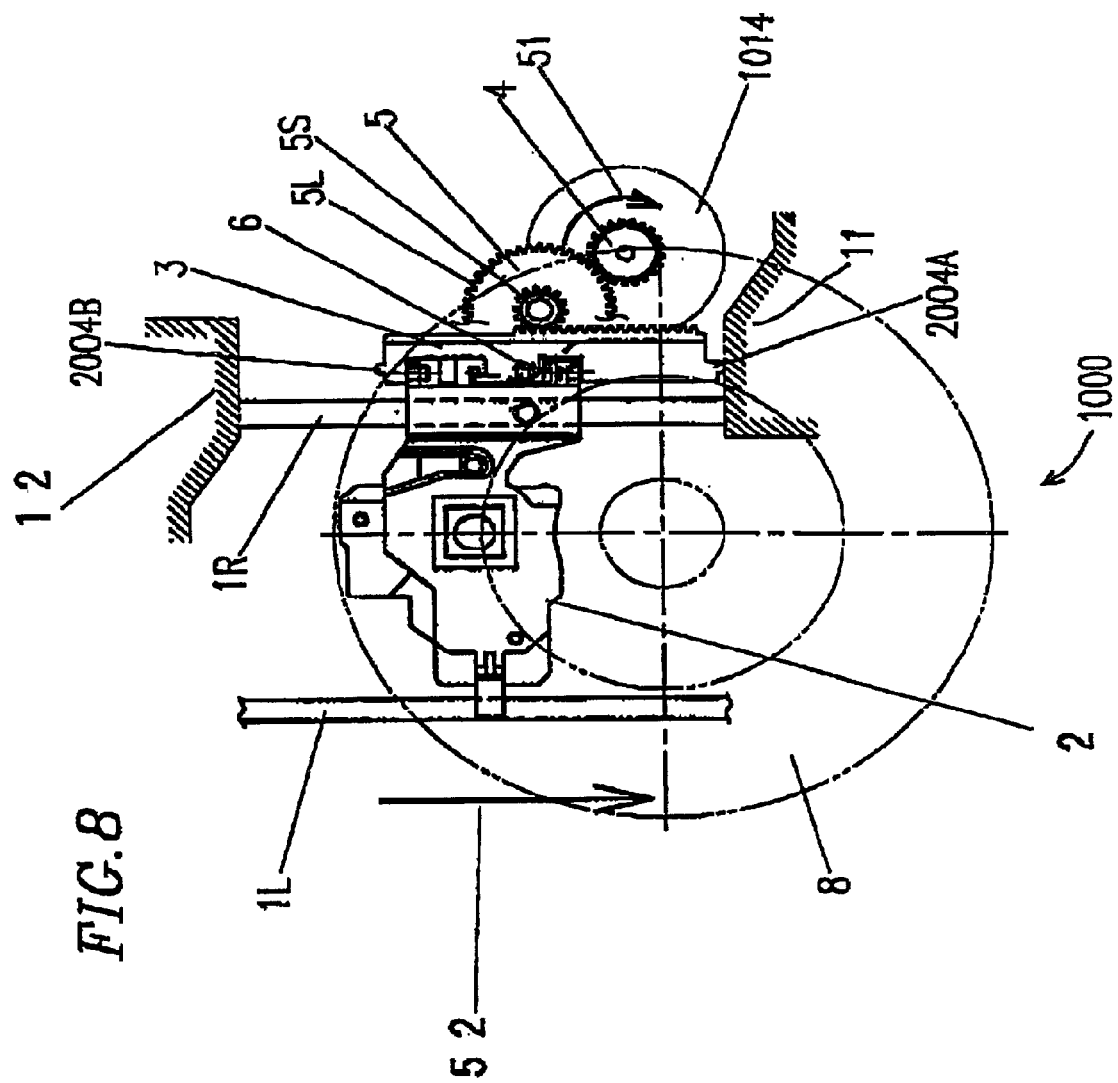
FIG. 8 is a diagram showing the optical head 2 being positioned at an end of the inner circumference portion of a recording region of a disk 8 (first position) of FIG. 1A.

FIG. 8 shows the optical head 2 being positioned at an end of the inner circumference portion of the recording region of the disk 8 (first position). When the optical disk apparatus 1000 is activated, the optical head 2 is shifted to the first position.

The shifting of the optical head 2 to the first position is achieved by rotating the motor 1014 in a direction indicated by an arrow 51. The turning force of the motor 1014 is transferred via the driving gear 4 and the stepped gear 5 to the rack 3. As a result, the optical head 2 is moved in a direction indicated by an arrow 52. When the optical head 2 reaches the first position, an inner circumference protrusion 2004A provided on the rack 3 strikes a most inner position stopper 11, so that the optical head 2 is stopped.

In the optical disk apparatus 1000, the position of the stopped optical head 2 is detected as a reference point which is used to shift the optical head 2. Therefore, the optical head 2 needs to be stopped at the end (first position) of the inner circumference portion of the recording region of the disk 8 as precisely as possible.

Figure 9:
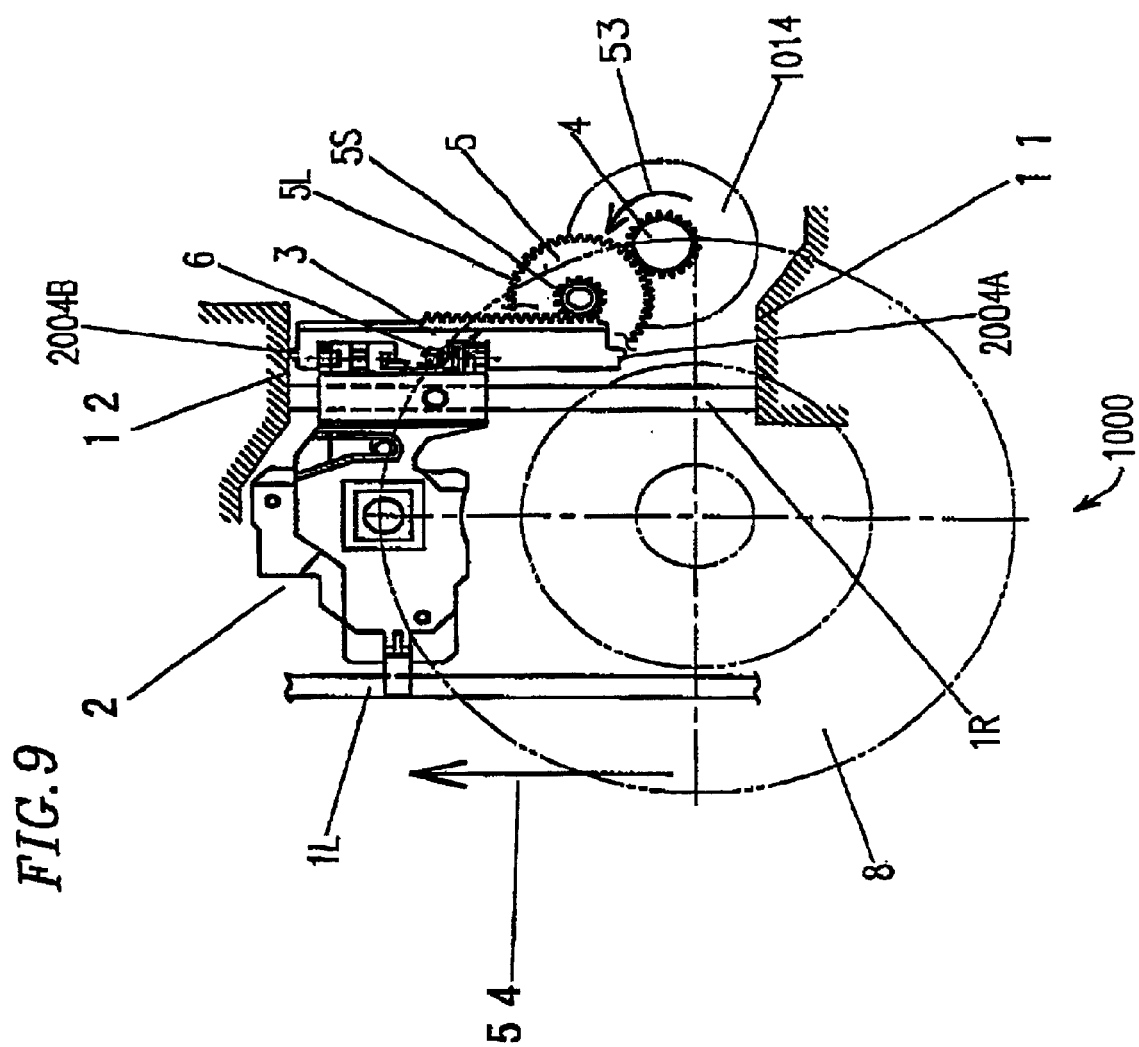
FIG. 9 is a diagram showing the optical head 2 being positioned at an end of the outer circumference portion of the recording region of the disk 8 (second position) of FIG. 1A.

FIG. 9 shows the optical head 2 being positioned at an end (second position) of the inner circumference portion of the recording region of the disk 8.

The shifting of the optical head 2 to the second position is achieved by rotating the motor 1014 in a direction indicated by an arrow 53. The turning force of the motor 1014 is transferred via the driving gear 4 and the stepped gear 5 to the rack 3. As a result, the optical head 2 is moved in a direction indicated by an arrow 54. When the optical head 2 reaches the second position, an outer circumference protrusion 2004B provided on the rack 3 strikes a most outer circumference position stopper 12, so that the optical head 2 is stopped.

In the normal operation of the optical disk apparatus 1000, the optical head 2 is not shifted up to the second position of FIG. 9. This is because in the normal operation of the optical disk apparatus 1000, the optical head 2 being positioned at a most outer circumference portion of the disk 8 is detected by reading data recorded in the most outer circumference portion of the recording region of the disk 8. Therefore, the optical head 2 being moved up until the outer circumference protrusion 2004B provided on the rack 3 strikes the most outer circumference position stopper 12 means an abnormal state (runaway) of the optical disk apparatus 1000. Such an abnormal state occurs, for example, since a scratch or dust attached on a surface of the disk 8 causes an error in reading data recorded in the most outer circumference portion of the disk 8.

In particular, the optical disk apparatus 1000 adopts a CAV method (a control method using a constant angular velocity), the disk 8 has a faster linear velocity in the outer circumference portion than in the inner circumference portion of the recording region. Therefore, a scratch or dust is more easily attached to the outer circumference portion than to the inner circumference portion.

In such an abnormal situation, a turning force (torque) greater than a normal turning force is likely to occur in the motor 1014. When the optical head 2 reaches and strikes the most outer circumference position stopper 12 with such a great turning force, the rack 3 is preferably released from engagement with the small gear 5S. This is because unless the engagement of the rack 3 with the small gear 5S is released, the motor 1014 is stopped (locked) while the great turning force is maintained, resulting in generation of an extraordinary amount of heat in the motor 1014. Such an extraordinary amount of heat has an adverse influence on the function of the optical disk apparatus 1000, potentially leading to a worst case scenario, such as the occurrence of ignition, in the optical disk apparatus 1000.

Figure 10:
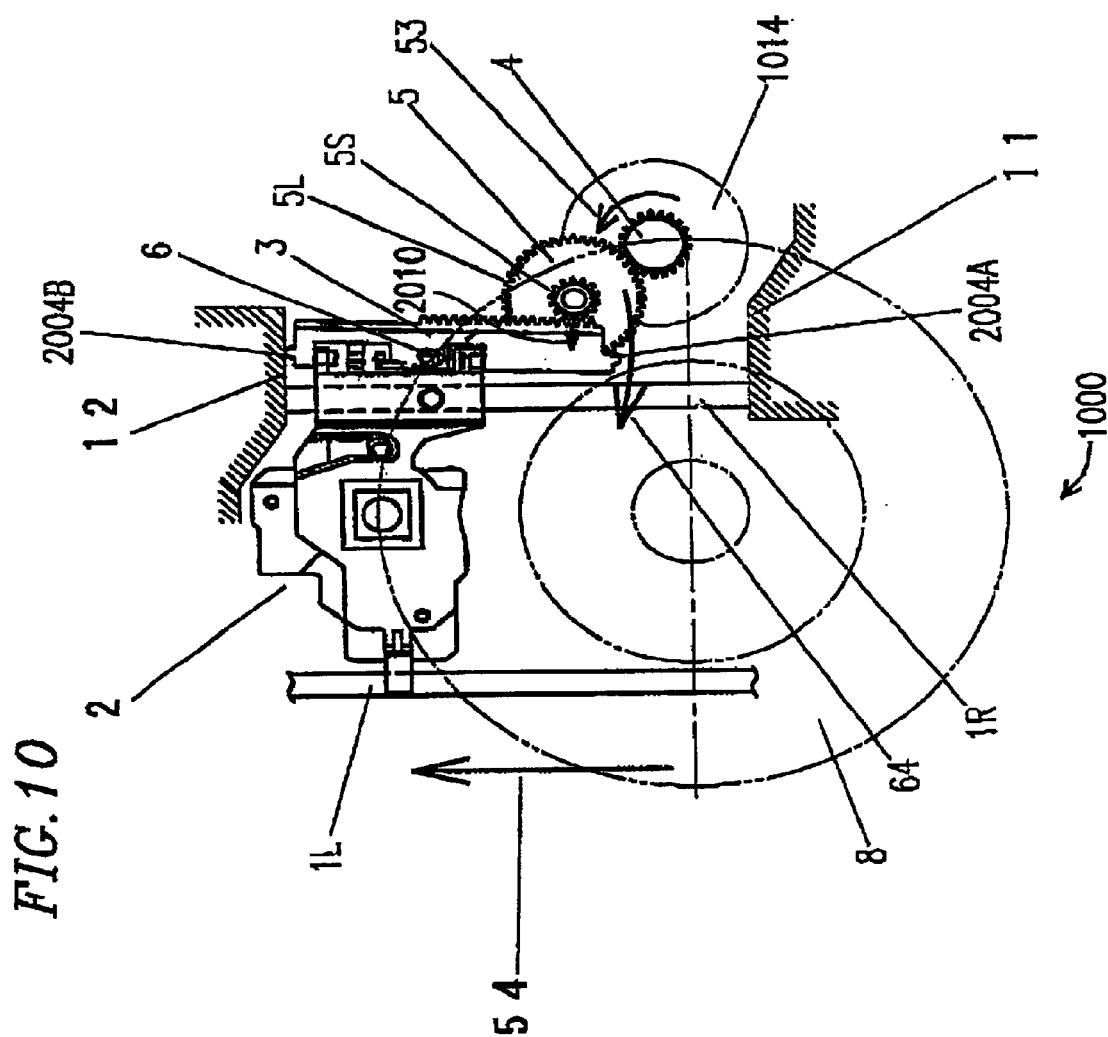
FIG. 10 is a diagram showing how the engagement of the rack 3 with a small gear 5S is released when the optical head 2 is located at the end of the outer circumference portion of the recording region of the disk 8 (second position) of FIG. 1A.

In view of this, the optical disk apparatus 1000 is preferably provided with a safety mechanism that if a great force is generated by the motor 1014 (i.e., a turning force greater than or equal to a predetermined value is exerted on the small gear 55) when the optical head 2 is located at the second position (FIG. 9), the engagement of the rack 3 with the small gear 5S is released. In contrast, when the optical head 2 is located at the first position of FIG. 8, preferably the engagement of the rack 3 with the small gear 5S is not released, so that the accuracy of the position at which the optical head 2 is stopped is increased FIG. 10 shows how the engagement of the rack 3 with the small gear 5S is released when the optical head 2 is located at the end of the outer circumference portion of the recording region of the disk 8 (second position). In FIG. 10, the small gear 5S exerts a radial force 2010 on the rack 3. Due to the radial force 2010, the rack 3 is moved in a direction indicated by an arrow 64.

Figure 11:
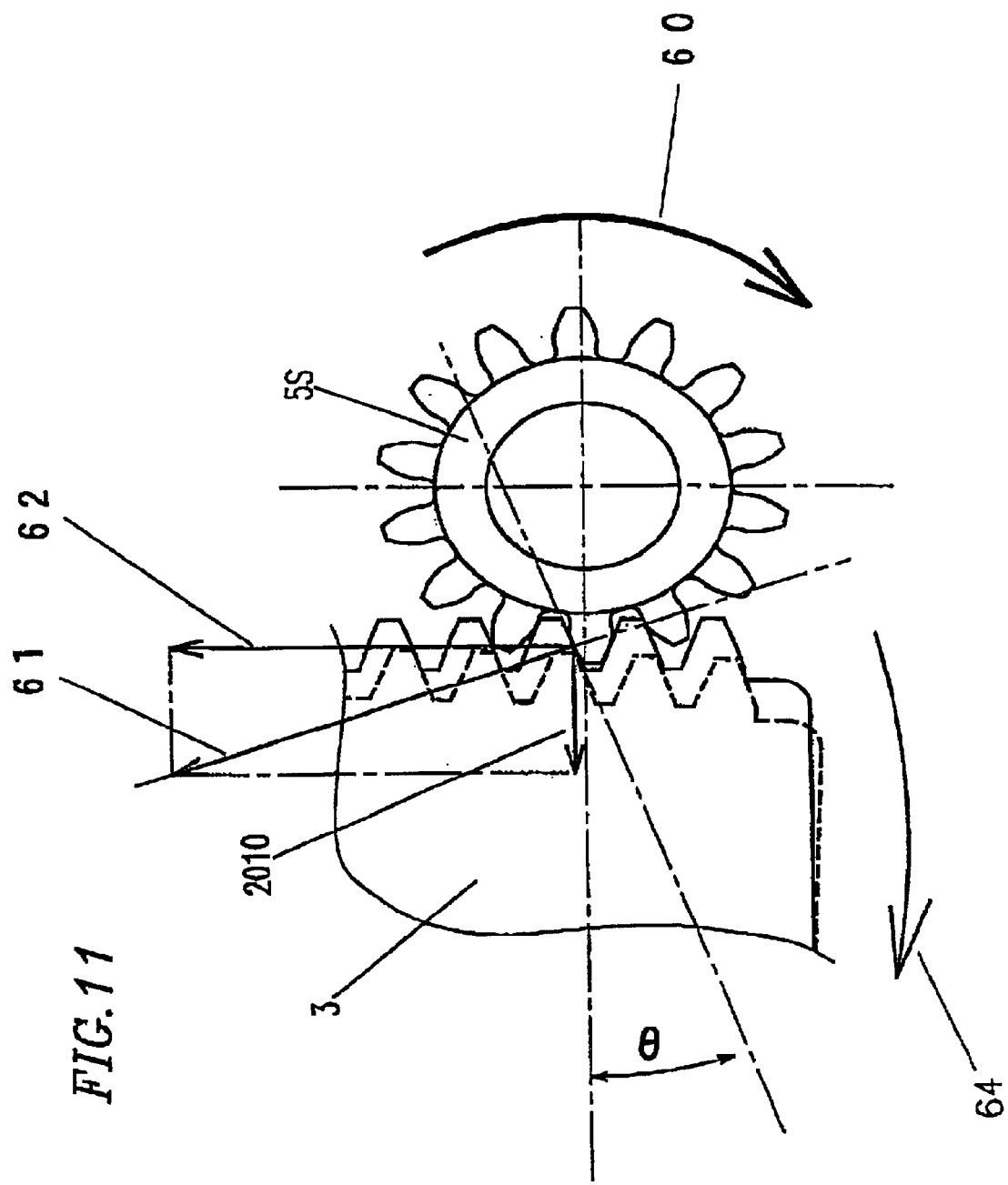
FIG. 11 is a diagram showing a principle of the small gear 5S exerting a radial force 2010 on the rack 3 of FIG. 1A.

FIG. 11 shows a principle of the small gear 5S exerting the radial force 2010 on the rack 3. As shown in FIG. 11, the rack 3 and the small gear 5S have involute gear teeth having pressure angles $\theta$ (the rack 3 having trapezoid gear teeth may be regarded as an involute gear having a pitch having an infinite radius). When a turning force in a direction indicated by an arrow 60 is exerted on the small gear 5S in the situation depicted in FIG. 9, a tooth surface of the small gear 5S presses a tooth surface of the rack 3 in a direction indicated by an arrow 61. The pressing force 61 includes a component 62 in a direction of the reference pitch line of the rack 3 and a component 2010 (radial force) perpendicular to the component 62. Therefore, the rack 3 is moved in a direction indicated by the arrow 64. The magnitude of the radial force 2010 is dependent on a turning force exerted on the small gear 5S.

A dashed line shown in FIG. 11 indicates the displacement of the rack 3.

Such a displacement of the rack 3 is caused by deformation of the rack 3 in such a manner that the reference pitch line 1018 of the rack 3 (FIG. 3) and the axis 1019 (second axis) have a skewed relationship without intersection. When the rack 3 is not deformed (the optical disk apparatus 1000 is normally operated), the reference pitch line 1018 of the rack 3 is parallel to the axis 1019. However, when the rack 3 is deformed, the reference pitch line 1018 of the rack 3 is no longer parallel to the axis 1019.

Figure 12:
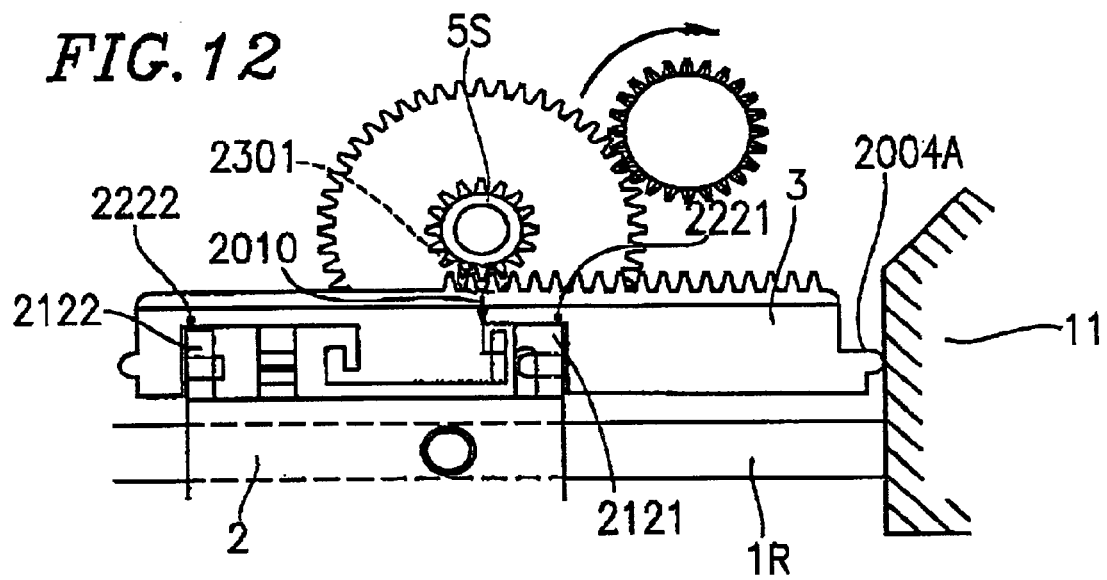
FIG. 12 is a diagram showing a principle that the engagement of the rack 3 with the small gear 5S is not released when the optical head 2 is positioned at the end of the inner circumference portion of the recording region of the disk 8 (first position) of FIG. 1A.

FIG. 12 shows a principle of the engagement of the rack 3 with the small gear 5S being not released when the optical head 2 is positioned at the end of the inner circumference portion of the recording region of the disk 8 (first position). As shown in FIG. 12, when the optical head 2 is positioned at the end of the inner circumference portion of the recording region of the disk 8, the rack 3 is engaged with the small gear 5S at a portion 2301 (first portion). In this situation, When a turning force is exerted on the small gear 5S, the radial force 2010 is exerted on the rack 3.

The optical head 2 is provided with contacting members 2121 and 2122. The contacting member 2121 contacts and presses the rack 3 so that a point 2221 (first contact point) of the rack 3 is limited from being displaced to leave the small gear 5S. Similarly, the contacting member 2122 contacts and presses the rack 3 so that a point 2222 (second contact point) of the rack 3 is limited from being displaced to leave the small gear 5S.

As shown in FIG. 12, the portion 2301 at which the rack 3 is engaged with the small gear 5S is located between the points 2221 and 2222 of the rack 3. Therefore, when the radial force 2010 is exerted on the rack 3 at the portion 2301, the rack 3 contacts and presses both the contacting members 2121 and 2122. Therefore, the rack 3 is not displaced to such an extent that the engagement of the rack 3 with the small gear 5S is released.

Figure 13:
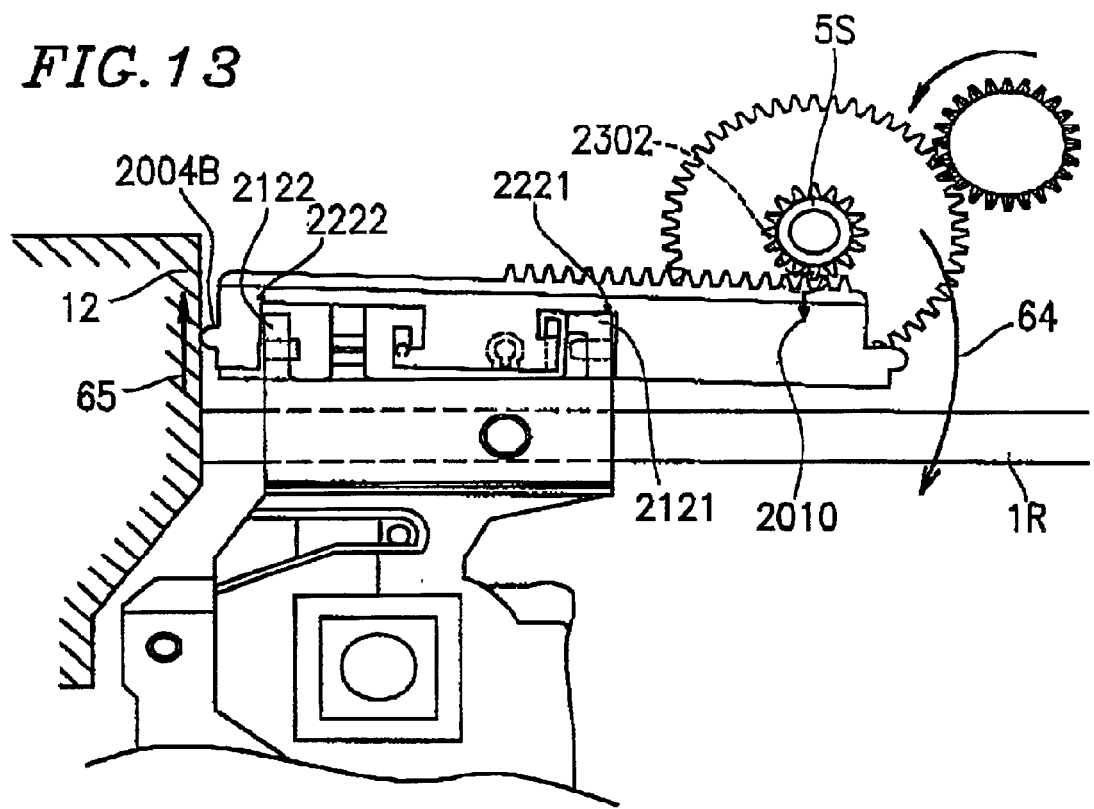
FIG. 13 is a diagram showing a principle that the engagement of the rack 3 with the small gear 5S is released when the optical head 2 is positioned at the end of the outer circumference portion of the recording region of the disk 8 (second position) of FIG. 1A.

FIG. 13 shows a principle of the engagement of the rack 3 with the small gear 5S being released when the optical head 2 is positioned at the end of the outer circumference portion of the recording region of the disk 8 (second position). As shown in FIG. 13, when the optical head 2 is positioned at the end of the outer circumference portion of the recording region of the disk 8, the rack 3 is engaged with the small gear 5S at a portion 2302 (second portion). In this situation, when a turning force is exerted on the small gear 5S, the radial force 2010 is exerted on the rack 3.

As shown in FIG. 13, the portion 2302 at which the rack 3 is engaged with the small gear 5S is located outside of the range between the points 2221 and 2222 of the rack 3. Therefore, when the radial force 2010 is exerted on the rack 3 at the portion 2302, the rack 3 contacts and presses only one of the contacting members 2121 and 2122 (the contacting member 2121 in the example of FIG. 13). Therefore, the rack 3 can be displaced around the point 2221 at which the rack 3 contacts the contacting member 2121 in the direction indicated by the arrow 64.

When the rack 3 is displaced in the direction indicated by the arrow 64, the outer circumference protrusion 2004B is slid along a surface of the most outer circumference position stopper 12 in a direction indicated by an arrow 65. Therefore, the outer circumference protrusion 2004B and the outer circumference position stopper 12 preferably have smooth surfaces so as to reduce friction in this sliding. The surface of the outer circumference position stopper 12 may be in the shape of a taper so as to further facilitate the sliding of the outer circumference protrusion 2004B in the direction indicated by the arrow 65.

As described above, such a displacement is generated by deformation of the rack 3. The stiffness of the rack 3 can be appropriately adjusted so that the engagement of the rack 3 with the small gear 5S is released when the radial force 2010 is greater than or equal to a predetermined value. Since the magnitude of the radial force 2010 is dependent on a turning force exerted on the small gear 5S, the optical disk apparatus 1000 can be designed so that the engagement of the rack 3 with the small gear 5S is released when the turning force exerted on the small gear 5S is greater than or equal to a predetermined value.

The stiffness of the rack 3 may be adjusted by changing the shape and/or material of the rack 3.

The predetermined value for the turning force of the small gear 5S may be set so that the magnitude of a driving current required to be applied to the motor 1014 so as to exert the turning force on the small gear 5S is less than or equal to a tolerable value above which a thermal influence interferes with the optical disk apparatus 1000.

Needless to say, the stiffness of the rack 3 needs to be adjusted so that the engagement of the rack 3 with the small gear 5S is not accidentally released in the normal movement of the optical head 2.

As described above in the optical disk apparatus 1000 of the present invention, the displacement of the rack 3 is limited so that the engagement of the rack 3 and the small gear 5S is released when the optical head 2 is located at the end of the inner circumference portion of the recording region of the disk 8 (first position). In addition, the displacement of the rack 3 is allowed to such an extent that the engagement of the rack 3 and the small gear 5S is released when the optical head 2 is located at the end of the outer circumference portion of the recording region of the disk 8 (second position). In this manner, the optical disk apparatus 1000 is provided with a safety mechanism.

The safety mechanism is achieved by twist (skew) deformation of the rack 3. The present invention is not limited to this. For example, the rack 3 may be designed so that the first portion 2301 of FIG. 12 and the second portion 2302 of FIG. 13 are included in separate members and the separate members may be connected with an elastic material so as to be displaced relative to each other.

Conversely, it is assumed that the optical disk apparatus 1000 detects the reference position of the optical head 2 at the end of the outer circumference portion of the recording region of the disk 8. The engagement of the rack 3 and the small gear 5S may be allowed to be released when the optical head 2 is located at the end of the inner circumference portion of the recording region of the disk 8. The engagement of the rack 3 with the small gear 5S may be limited from being released when the optical head 2 is located at the end of the outer circumference portion of the recording region of the disk 8.

4. Variations in the Rack

Figure 14:
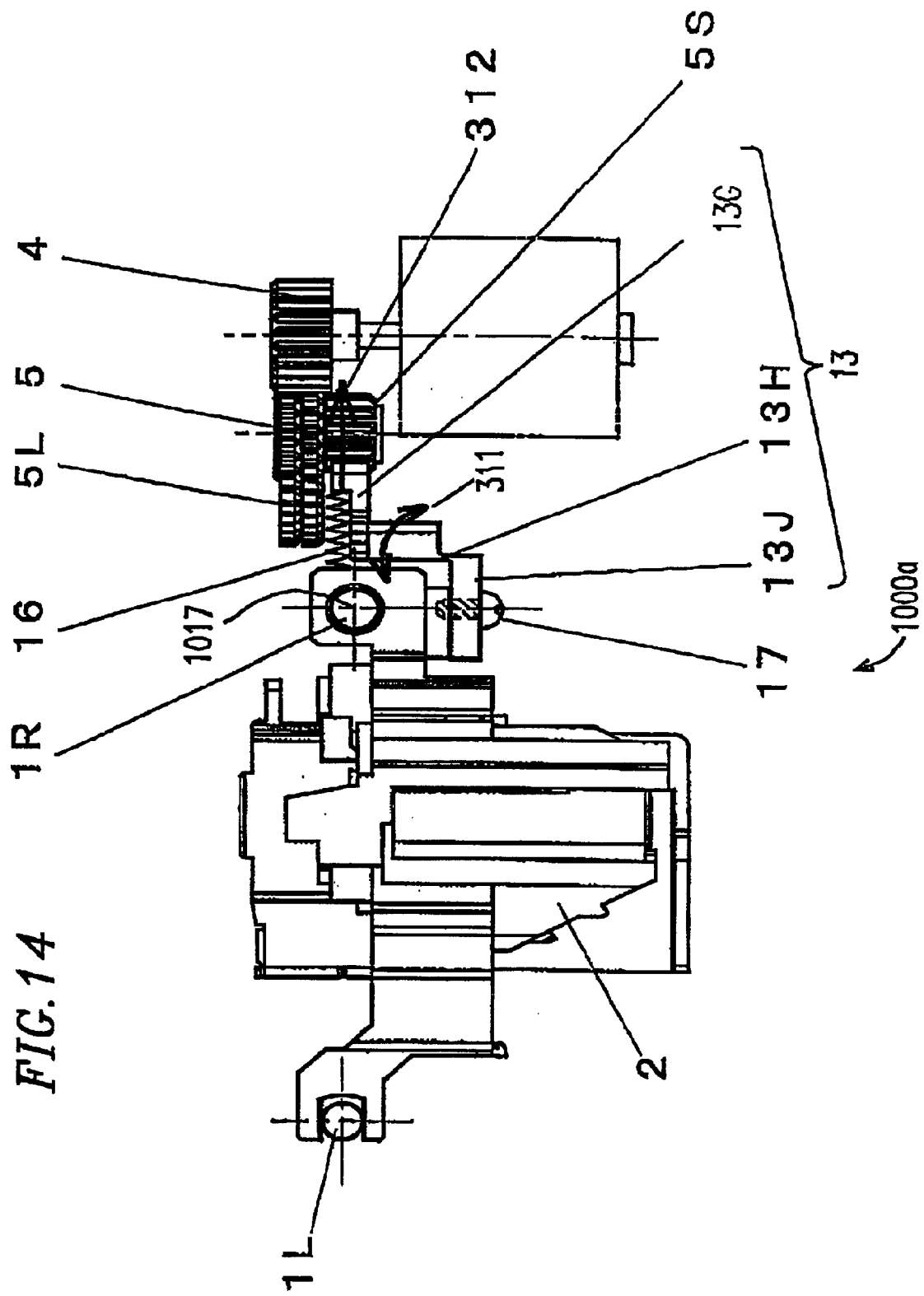
FIG. 14 is a diagram showing the moving mechanism of an optical head 2 of an optical disk apparatus 1000a which is a variation of the above-described embodiment of the present invention.
Figure 15A:
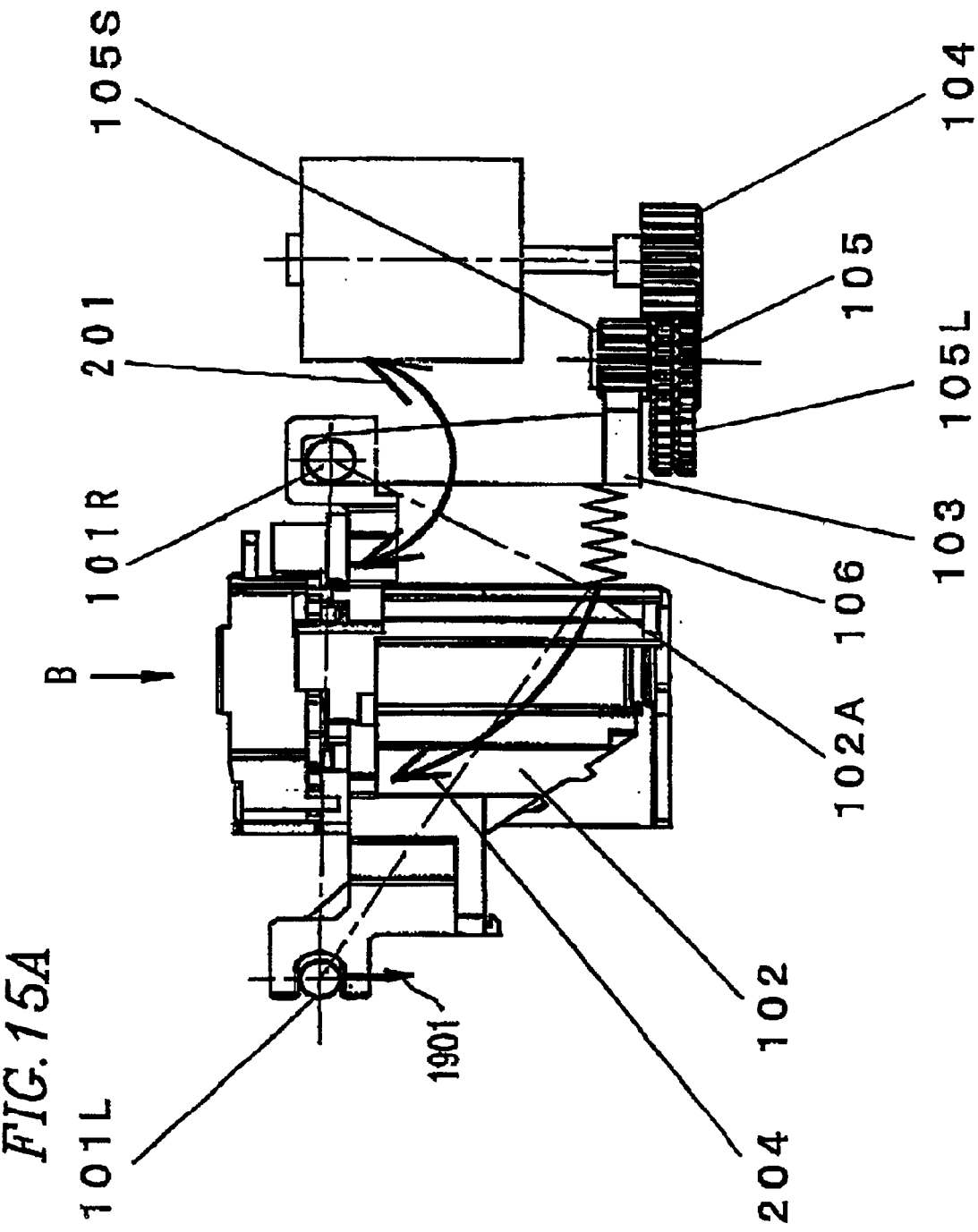
FIG. 15A is a side view showing a moving mechanism of an optical head described in Japanese Patent No. 2902876.
Figure 15B:
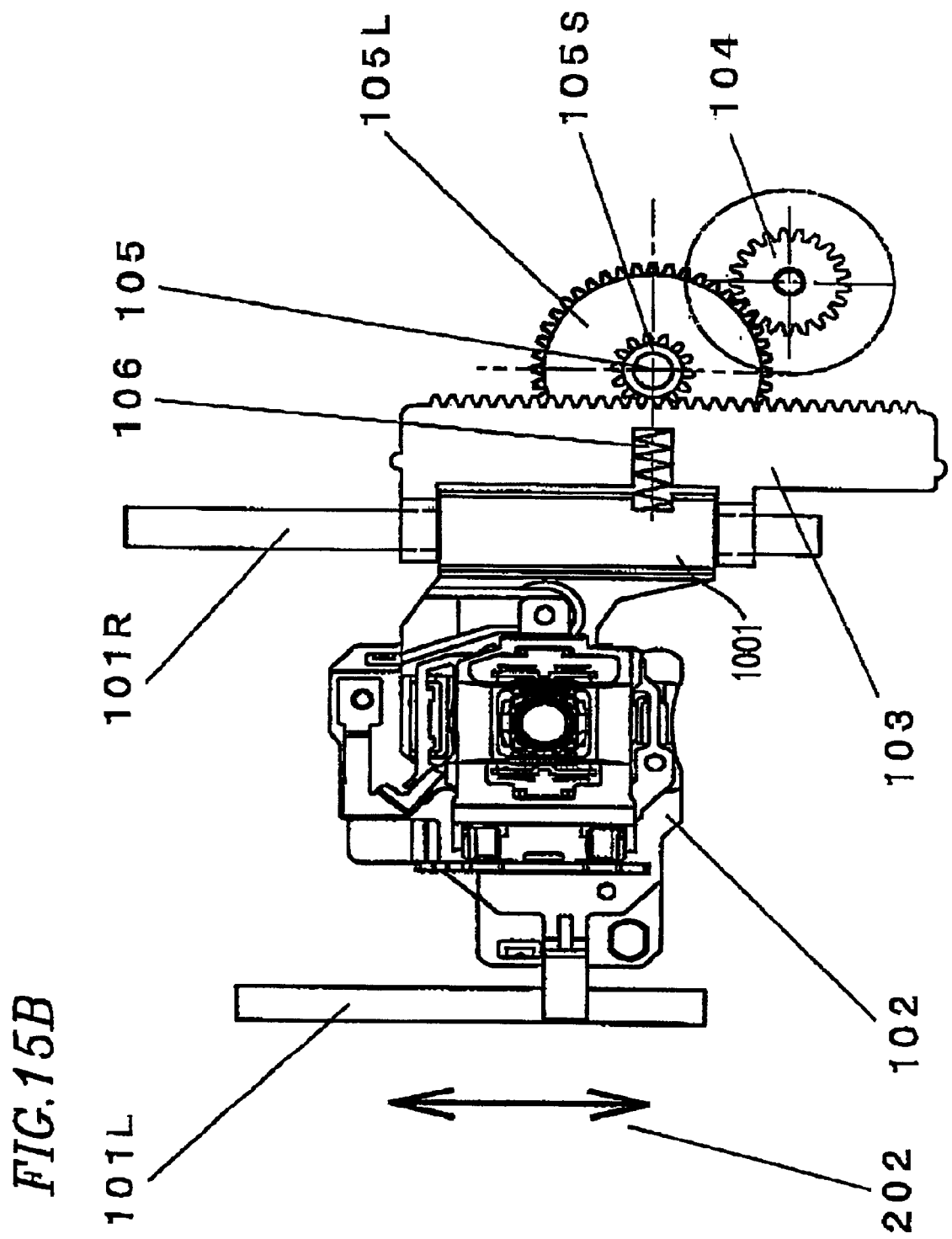
FIG. 15B is a plan view of the moving mechanism of the optical head of FIG. 15A viewed in a direction indicated by an arrow B.
Figure 16:
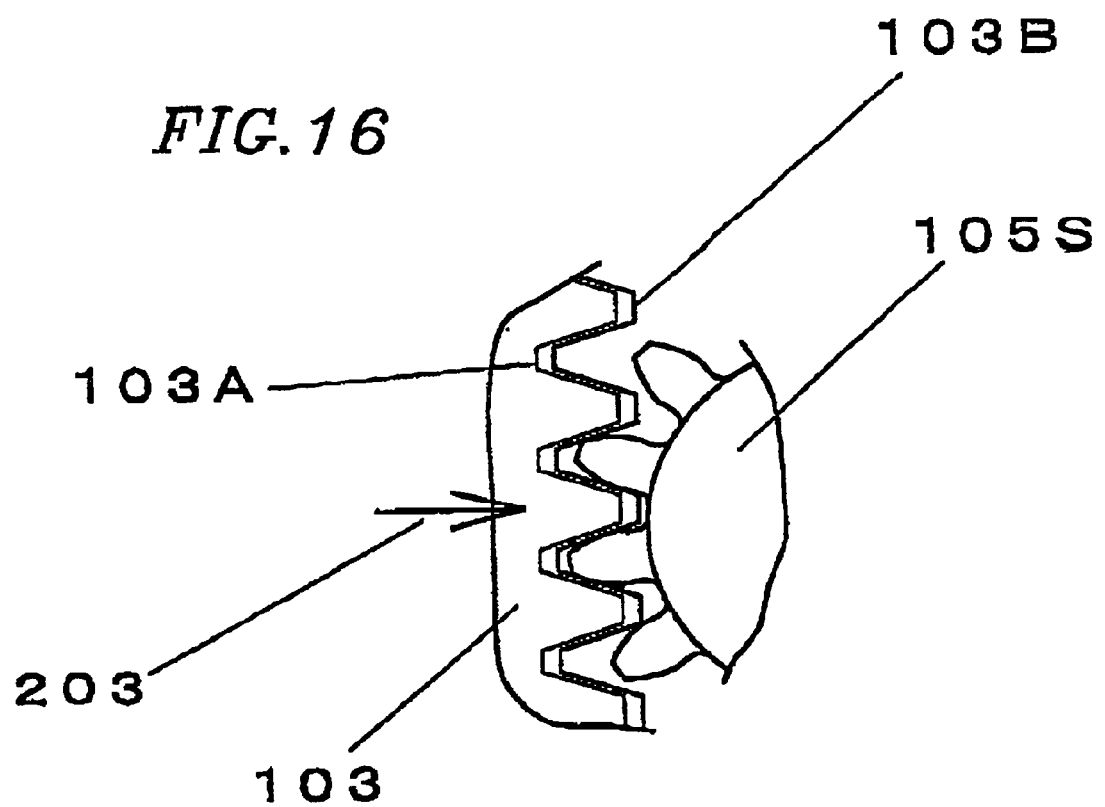
FIG. 16 is a diagram showing states of a rack 103 and a small gear 105S of FIG. 15A which are engaged with each other.

FIG. 14 shows the moving mechanism of an optical head 2 of an optical disk apparatus 1000a which is a variation of the above-described embodiment of the present invention. The optical disk apparatus 1000a comprises a rack 13 and a pressing spring 16 in place of the respective rack 3 and the pressing. spring 6 of the optical disk apparatus 1000 of FIG. 1A. The rack 13 comprises a gear portion 13G to be engaged with a small gear 5S, a supporting portion 13J, and a hinge portion 13H. The rack 13 is made of flexible material. The hinge portion 13H (second axis) has a shape which can be bent around the hinge portion 13H (i.e., a shape having a sufficiently low stiffness). Therefore, the gear portion 13G can be rotated about the hinge portion 13H in a direction indicated by an arrow 311. The hinge portion 13H is arranged parallel to the reference pitch line (not shown) of the rack 13.

The rack 13 is fixed to the optical head 2 by a screw 17 at the supporting portion 133. The rack 13 is preferably made of flexible material suitable for a hinge, such as polyacetal resin, polypropylen, polyethylene, or nylon.

The pressing spring 16 is provided between the optical head 2 and the gear portion 13G. Therefore, the gear portion 13G is pressed toward the small gear 5S, specifically, in a direction indicated by an arrow 312. The pressing spring 16 is not limited to a particular form. The optical disk apparatus 1000a is also constructed so that the vector of a force exerted by the small gear 5S on the gear portion 13G of the rack 13 in response to pressing of the gear portion 13G toward the small gear 5S substantially intersects the central axis 1017 of the guide shaft 1L.

In the optical disk apparatus 1000a, the rack 13 is fixed to the optical head 2 from a rear side thereof with the screw 17. Therefore, the rack 13 is more easily attached to and detached from the optical head 2 than in the optical disk apparatus 1000 described with reference to FIGS. 5, 6A, and 6B. Therefore, the number of steps in an exchange operation of the rack 13 due to a defect or the like can be reduced.

In the above-described explanation, the gear and the rack have involute teeth. The present invention is not limited to this. For example, the gear and the rack may have cycloid teeth or teeth of another shape.

Although the optical head 2 is driven by the motor 1014 of a rotation type in the above-described examples, the optical head 2 may be driven by a direct driving method, such as a linear motor or solenoid, or any other means capable of moving the optical head 2.

Cross-sectional shapes of the guide shafts 1R and 1L may not be a circle. The cross-sectional shape of the guide shaft 1R may be any shape as long as the guide shaft 1R supports the optical head 2 along an axis in such a manner so that the optical head 2 can be moved. The cross-sectional shape of the guide shaft 1L may be any shape as long as the guide shaft 1L limits the rotation of the optical head 2 about the axis.

The pressing spring 6 is not limited to a torsion coil spring, The pressing spring 6 may be made of any elastic material (e.g., rubber) as long as the pressing spring 6 presses the rack 3 toward the small gear 5S.

In the optical disk apparatus of the present invention, an optical head is supported by a first guide member in such a manner that the optical head can be moved along a first axis of a first guide member. A pressing means presses a rack toward a pinion. In response to this, the vector of a force exerted by the pinion on the rack intersects the first axis. Therefore, a moment about the first axis is not exerted on the rack. Since the rack is mounted on the optical head, the moment about the first axis is not exerted on the optical head. As a result, a force opposing the moment is not generated on a second guide member limiting rotation about the first axis. Therefore, the optical head can be moved in a stable manner.

Further, in the optical disk apparatus of the present invention, the rack is mounted on the optical head using a protruding portion provided on one of the rack and the optical head and a pit portion provided on the other of the rack and the optical head which is engaged with the protruding portion. The protruding portion has a shape obtained by cutting a cylinder along a plane parallel to an axis of the cylinder. The pit portion is provided with a groove having a width smaller than the diameter of the cylinder, through which the protruding portion is passed when the rack is attached to and detached from the optical head. The rack is easily attached to and detached from the optical head by the protruding portion being passed through the groove.

Various other modifications will be apparent to and can be readily made by those skilled in the art without departing from the scope and spirit of this invention, Accordingly, it is not intended that the scope of the claims appended hereto be limited to the description as set forth herein, but rather that the claims be broadly construed.

What is claimed is:

1. An optical disk apparatus, comprising:
   an optical head for recording data to or reproducing data from a disk having a recording region ranging from an outer circumference portion to an inner circumference portion;
   a first guide member having a first axis substantially parallel to the disk, for supporting the optical head in such a manner that the optical head can be moved along the first axis from an end of the outer circumference portion to an end of the inner circumference portion;
   a second guide member for limiting rotation of the optical head about the first axis;
   a rack provided on the optical head, having a reference pitch line substantially parallel to the first axis;
   a pinion for moving the optical head by the pinion being engaged with the rack and being rotated; and
   a pressing member for pressing the rack toward the pinion,
   wherein the vector of a force exerted by the pinion on the rack in response to the pressing member pressing the rack toward the pinion substantially intersects the first axis.

2. An optical disk apparatus according to claim 1, wherein the rack is mounted on the head in such a manner that the rack can be rotated about a second axis substantially parallel to the reference pitch line.

3. An optical disk apparatus according to claim 1, wherein the rack is mounted on the optical head in such a manner that the rack can be attached to and detached from the optical head.

4. An optical disk apparatus according to claim 1, wherein a protruding portion is provided on one of the rack and the optical head, a pit portion is provided on the other of the rack and the optical head, and the rack is mounted by the optical head by engagement of the protruding portion with the pit portion.

5. An optical disk apparatus according to claim 1, wherein the protruding portion has a shape obtained by cutting a portion of a cylinder along a plane parallel to an axis of the cylinder, the pit portion is provided with a groove having a width smaller than a diameter of the cylinder, and the protruding portion is passed through the groove when the rack is attached to and detached from the optical head.

6. An optical disk apparatus according to claim 2, further comprising an elastic member for pressing the rack in a direction along the second axis so as to substantially remove a gap between the rack and the optical head along the second axis.

7. An optical disk apparatus according to claim 6, wherein the pressing member and the elastic member are integrated together.

8. An optical disk apparatus according to claim 1, wherein:
   the rack is mounted on the optical head in such a manner that a portion of the rack engaged with the pinion can be rotated about a second axis substantially parallel to the reference pitch line; and
   the rack is made of flexible material and a portion of the rack along the second axis has a shape so that the rack can be bent about the second axis.

9. An optical disk apparatus according to claim 1, wherein displacement of the rack is limited to such an extent that engagement of the rack with the pinion is released when the optical head is located at a first position which is at one of the end of the inner circumference portion and the end of the outer circumference portion, and the displacement of the rack is allowed to such an extent that the engagement of the rack with the pinion is released when the optical head is located at a second position which is at the other of the end of the inner circumference portion and the end of the outer circumference portion and when a turning force greater than or equal to a predetermined value is exerted on the pinion.

10. An optical disk apparatus according to claim 9, wherein:
    a first portion of the rack is engaged with the pinion when the optical head is located at the first position, and a second portion of the rack is engaged with the pinion when the optical head is located at the second position;
    the optical head includes a first contacting member for limiting a first contact point of the rack from being displaced away from the pinion, and a second contacting member for limiting a second contact point of the rack from being displaced away from the pinion;
    the first portion is located in a range between the first and second contact points of the rack; and
    the second portion is located outside the range between the first and second contact points of the rack.

11. An optical disk apparatus according to claim 10, wherein the rack is mounted on the optical head in such a manner that the rack can be rotated about a second axis parallel to the reference pitch line, and the rack is deformed in such a manner that the reference pitch line and the second axis have a skewed relationship without intersection when the optical head is located at the second position and when a turning force greater than or equal to a predetermined value is exerted on the pinion.

12. An optical disk apparatus according to claim 9, further comprising:
    a driving section for rotating the pinion in the presence of applied driving current, wherein the predetermined value is set so that a magnitude of the driving current, required to drive the pinion to obtain a turning force having the predetermined value, is less than or equal to a tolerable value above which a thermal influence interferes with the optical disk apparatus.

13. An optical disk apparatus, comprising:

an optical head for recording data to or reproducing data from a disk having a recording region ranging from an outer circumference portion to an inner circumference portion;

a first guide member having a first axis substantially parallel to the disk, for supporting the optical head in such a manner that the optical head can be moved along the first axis from an end of the outer circumference portion to an end of the inner circumference portion;

a second guide member for limiting rotation of the optical head about the first axis;

a rack provided on the optical head, having a reference pitch line substantially parallel to the first axis;

a pinion for moving the optical head by the pinion being engaged with the rack and being rotated about a third axis substantially perpendicular to the reference pitch line; and a pressing member for pressing the rack toward the pinion, wherein a line perpendicular to and substantially intersecting both the third axis and the reference pitch line substantially intersects the first axis.

14. An optical disk apparatus, comprising:

an optical head for recording data to or reproducing data from a disk having a recording region ranging from an outer circumference portion to an inner circumference portion;

a first guide member having a first axis substantially parallel to the disk, for supporting the optical head in such a manner that the optical head can be moved along the first axis from an end of the outer circumference portion to an end of the inner circumference portion;

a second guide member for limiting rotation of the optical head about the first axis;

a rack provided on the optical head, having a reference pitch line substantially parallel to the first axis;

a pinion for moving the optical head by the pinion being engaged with the rack and being rotated; and a pressing member for pressing the rack toward the pinion, wherein:

the vector of a force exerted by the pinion on the rack in response to the pressing member pressing the rack toward the pinion substantially intersects the first axis; and displacement of the rack is limited to such an extent that engagement of the rack with the pinion is released when the optical head is located at a first position which is at one of the end of the inner circumference portion and the end of the outer circumference portion, and the displacement of the rack is allowed to such an extent that the engagement of the rack with the pinion is released when the optical head is located at a second position which is at the other of the end of the inner circumference portion and the end of the outer circumference portion and when a turning force greater than or equal to a predetermined value is exerted on the pinion.

* * * * *